US009264604B2

(12) United States Patent
Okawa

(10) Patent No.: US 9,264,604 B2
(45) Date of Patent: Feb. 16, 2016

(54) OPTICAL INSTRUMENT, AND CONTROL METHOD FOR OPTICAL INSTRUMENT

(71) Applicant: Olympus Corporation, Shibuya-ku, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/472,061

(22) Filed: Aug. 28, 2014

(65) Prior Publication Data

US 2015/0070564 A1 Mar. 12, 2015

(30) Foreign Application Priority Data

Sep. 9, 2013 (JP) ................. 2013-186314

(51) Int. Cl.
| | | |
|---|---|---|
| *H04N 5/232* | (2006.01) | |
| *G02B 7/10* | (2006.01) | |
| *G01D 5/12* | (2006.01) | |
| *G02B 7/04* | (2006.01) | |

(52) U.S. Cl.
CPC ............. *H04N 5/23212* (2013.01); *G01D 5/12* (2013.01); *G02B 7/04* (2013.01); *G02B 7/102* (2013.01)

(58) Field of Classification Search
CPC ...... H04N 5/23212; G02B 7/102; G02B 7/04; G02B 17/14; G01D 5/12
USPC ............ 348/345–351; 396/73–77, 79–82, 85, 396/87, 104, 133, 134; 359/661, 691, 696, 359/698, 699, 701, 702, 706
See application file for complete search history.

(56) References Cited

U.S. PATENT DOCUMENTS

| | | | | | |
|---|---|---|---|---|---|
| 5,448,413 | A | * | 9/1995 | Kobayashi | G02B 7/102 359/695 |
| 8,582,018 | B2 | * | 11/2013 | Futami | G02B 7/08 348/326 |
| 8,953,090 | B2 | * | 2/2015 | Hokkezu | G02B 7/36 348/231.4 |
| 2010/0046085 | A1 | * | 2/2010 | Yumiki | G02B 7/102 359/684 |
| 2014/0293439 | A1 | * | 10/2014 | Okawa | G02B 15/16 359/696 |
| 2014/0293440 | A1 | * | 10/2014 | Okawa | G02B 7/282 359/698 |

FOREIGN PATENT DOCUMENTS

JP 2007-286225 11/2007

* cited by examiner

*Primary Examiner* — Tuan Ho
*Assistant Examiner* — Marly Camargo
(74) *Attorney, Agent, or Firm* — John C. Pokotylo; Straub & Pokotylo

(57) ABSTRACT

An optical instrument comprises a control section for driving a lens group in an optical axis direction, a first position detection section for detecting an absolute position of the lens group, a second position detection section for detecting a relative position of the lens group, and a storage section for storing first data corresponding to output of the second position detection section corresponding to a specified position, and second data corresponding to a target position, wherein, the control section acquires output of the second position detection section, at a point when a specified variation has occurred, as third data, calculates a stop target position based on the first data and the third data and executes a stop operation for the lens group to stop the lens group, and corrects output of the second position detection section in a state, based on the second data, and the stop target position.

19 Claims, 20 Drawing Sheets

FIG. 5A
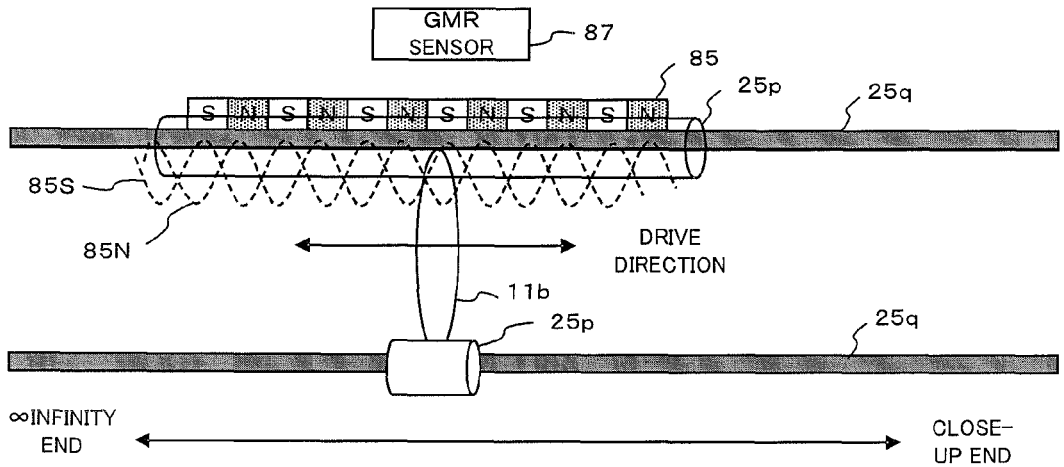
FIG. 5B
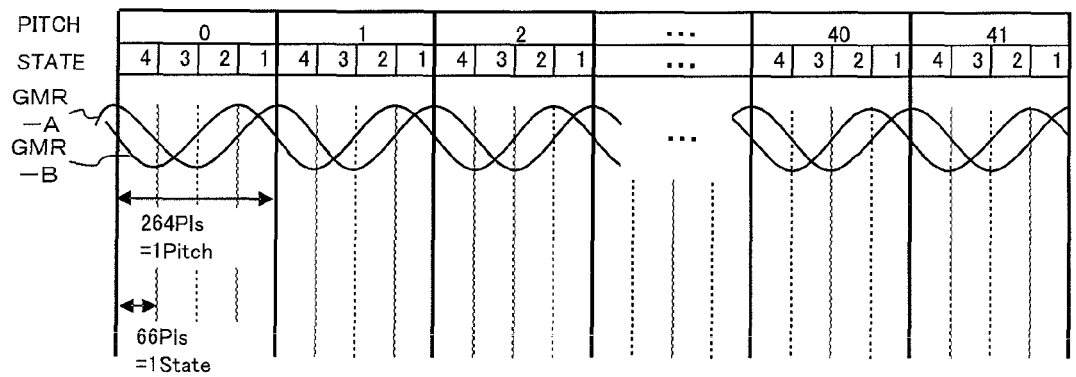
FIG. 5C
| STATE | 1 | 2 | 3 | 4 |
|---|---|---|---|---|
| GMR-A | H | L | L | H |
| GMR-B | H | H | L | L |
FIG. 5D
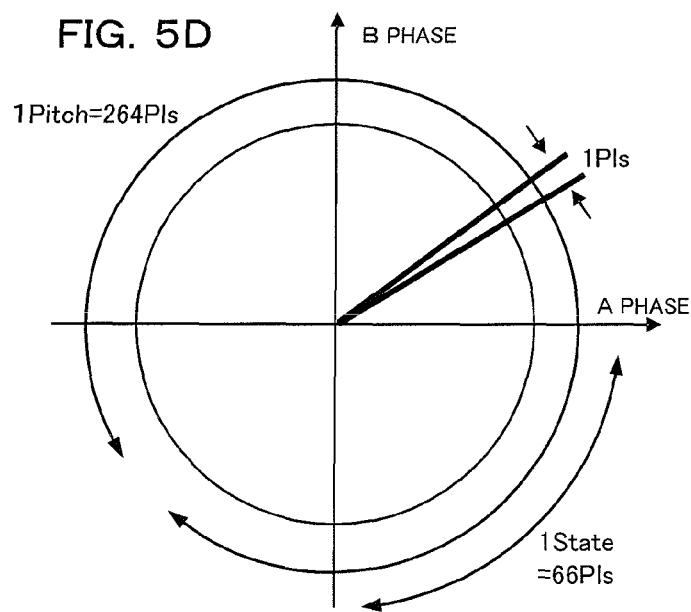

OPTICAL INSTRUMENT, AND CONTROL METHOD FOR OPTICAL INSTRUMENT

Benefit is claimed, under 35 U.S.C. §119, to the filing date of prior Japanese Patent Application No. 2013-186314 filed on Sep. 9, 2013. This application is expressly incorporated herein by reference. The scope of the present invention is not limited to any requirements of the specific embodiments described in the application.

BACKGROUND OF THE INVENTION

1. Field of the Invention

The present invention relates to an optical instrument having a lens group, and capable of driving this lens group in an optical axis direction, and to a control method for an optical instrument.

2. Description of the Related Art

In an optical instrument having a photographing lens etc., it has been proposed to carry out positional control of a lens group by controlling a lens group with an actuator instead of a cam tube etc. For example, Japanese Patent laid-open No. 2007-286225 (hereafter referred to as patent publication 1) discloses providing a plurality of photosensors for a single lens group in order to carry out position control of the lens group, and determining a specific position of the lens group based on output of these photosensors.

SUMMARY OF THE INVENTION

An object of the present invention is to provide an optical instrument that is capable of carrying out positional control of a lens group with high precision.

An optical instrument of the present invention has a lens group capable of moving in an optical axis direction, and comprises a control section for driving the lens group in the optical axis direction, a first position detection section for detecting an absolute position of the lens group in the optical axis direction, a second position detection section for detecting a relative position of the lens group in the optical axis direction, and a storage section for storing first data corresponding to output of the second position detection section corresponding to a specified position of the lens group, and second data corresponding to a target position to which the lens group is to be moved, wherein, the control section drives the lens group and acquires output of the second position detection section, at a point in time when a specified variation has occurred in the output of the first position detection section corresponding to the specified position, as third data, calculates a stop target position based on the first data and the third data and executes a stop operation for the lens group to stop the lens group, and corrects outputs of the second position detection section in a state where the lens group has been stopped, based on the second data that has been stored in the storage section, and the stop target position.

An optical instrument of the present invention has a lens group capable of moving in an optical axis direction, and comprises a control section for controlling position of the lens group by driving in the optical axis direction, a first position detection section for detecting an absolute position of the lens group in the optical axis direction, a second position detection section for detecting a relative position of the lens group in the optical axis direction, and a storage section for storing first data corresponding to output of the second position detection section corresponding to a specified position of the lens group, and second data corresponding to a target position to which the lens group is to be moved, wherein, the control section drives the lens group and acquires output of the second position detection section, at a point in time when a specified variation has occurred in the output of the first position detection section corresponding to the specified position, as third data, calculates a stop target position based on the third data and executes a stop operation for the lens group to stop the lens group, and corrects output of the second position detection section in a state where the lens group has been stopped, based on a difference between the first data and the third data, the second data and the stop target position.

A control method of the present invention, for controlling initial position of a lens group of an optical instrument having a lens group capable of moving in an optical axis direction, and comprising a first position detection section for detecting absolute position of the lens group in the optical axis direction, and a second position detection section for detecting relative position of the lens group in the optical axis direction, comprises driving the lens group and acquiring output of the second position detection section, at a point in time when a specified variation has occurred in the output of the first position detection section, as third data, calculating a stop target position based on predetermined first data as output of the second position detection section corresponding to a position of the lens group corresponding to specified variation in output of the first position detection section, and the third data, and executing a stop operation for the lens group to stop the lens group, and correcting output of the second position detection section in a state where the lens group has been stopped, based on predetermined second data as data corresponding to target position for stopping the lens group, the second data, and the stop target position.

BRIEF DESCRIPTION OF THE DRAWINGS

FIG. 5A to FIG. 5D are drawings showing structure and output of a GMR sensor, in the camera of one embodiment of the present invention.

DETAILED DESCRIPTION OF THE PREFERRED EMBODIMENTS

Figure 1:
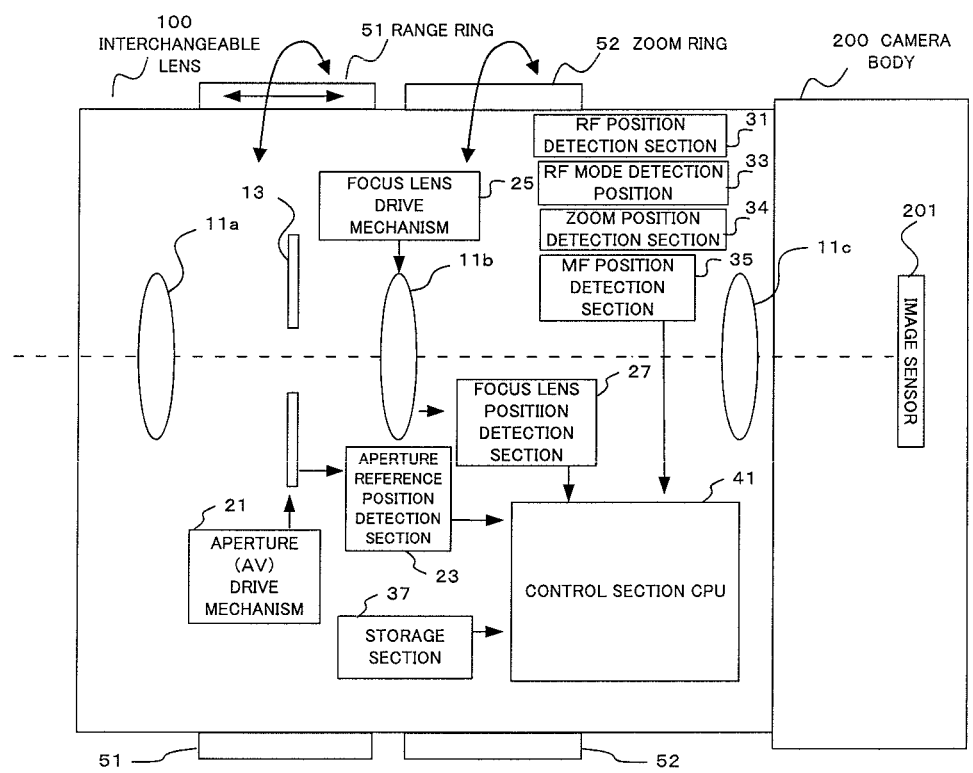
FIG. 1 is a block diagram showing the structure of a camera of one embodiment of the present invention.
Figure 2:
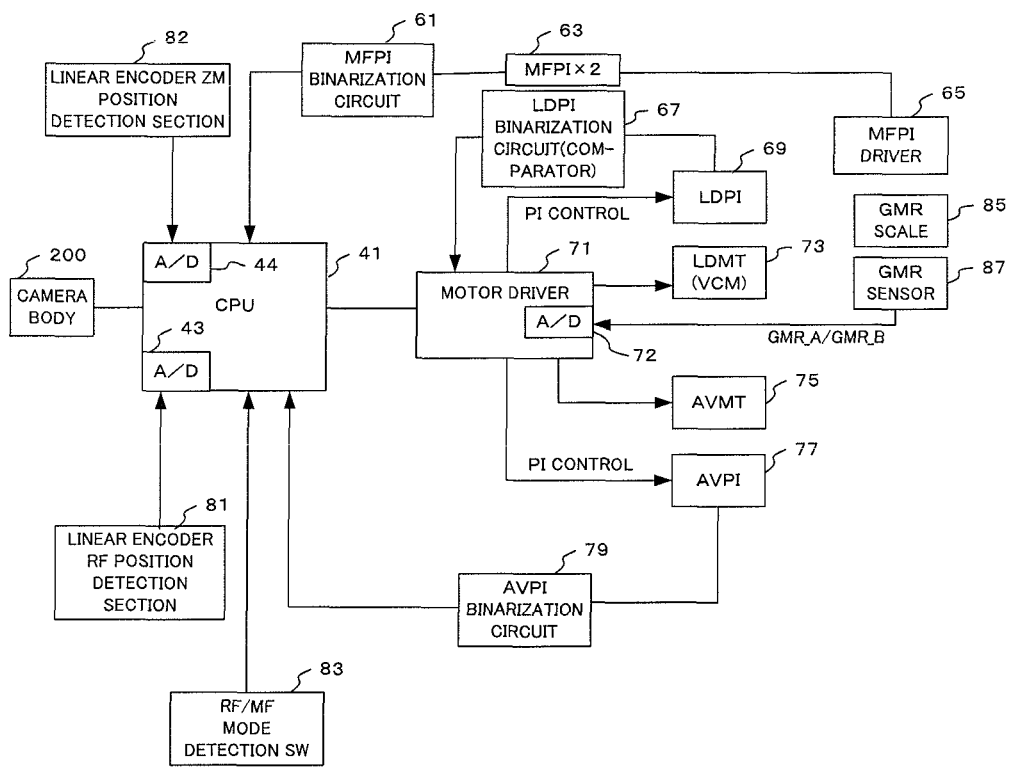
FIG. 2 is a block diagram mainly showing the electrical structure of a camera of one embodiment of the present invention.

A preferred one embodiment using a camera to which the present invention has been applied will be described in the following in accordance with the drawings. FIG. 1 is a block diagram showing the structure of a camera of one embodiment of the present invention, and FIG. 2 is a block diagram showing the electrical structure of this camera. This camera is constituted by a camera body 200 and an interchangeable lens 100 that can be attached to and detached from this camera body 200. It is also possible, however, for the lens barrel and the camera body to be integrally formed.

A photographing lens 11 made up of lenses 11a to 11c is provided within the interchangeable lens 100. A subject image is formed by the photographing lens 11. Within this lens 11, a focus lens 11b is a lens for focus adjustment, and is capable of being moved in the optical axis direction by a focus lens drive mechanism 25. The focus lens drive mechanism 25 has a focus lens actuator (LD motor 73 which will be described later) and a focus lens drive circuit. The focus lens 11b is therefore provided inside the lens barrel, and functions as a focus adjustment lens capable of movement in the optical axis direction. Also, some of the lenses 11a-11c are zoom lenses for varying focal length. Zoom lens groups are therefore provided inside the interchangeable lens 100.

Also, a focus lens position detection section 27 has two focus lens photo interrupters (hereafter referred to as "LDPI") 69 for detecting reference position, as will be described later, and a GMR (giant magneto-resistance) sensor 87 for detecting high resolution relative position (refer to FIG. 2). The LDPI 69 functions as a first position detection section for detecting absolute position of the lens group in an optical axis direction, while the GMR sensor 87 functions as a second position detection section for detecting relative position of the lens group in the optical axis direction.

The LDPI 69 outputs a detection signal to the CPU 41 if the focus lens 11b reaches a reference position. With this embodiment, position detection of the focus lens 11b is carried out using absolute position that has been detected by the GMR sensor 87, with reference to the reference position that has been detected by the LDPI 69.

An aperture 13 is arranged between the lens 11a and the lens 11b. The aperture 13 has on opening size varied by an aperture drive mechanism 21, to vary an amount of subject light that passes through the photographing lens 11. The aperture drive mechanism 21 has an aperture actuator and an aperture drive circuit etc. A stepping motor is used as the actuator, and fine control is carried out using micro step drive. The aperture 13 may also be arranged at a position other than between the lens 11a and the lens 11b.

An aperture reference position detection section 23 outputs a detection signal to the CPU 41 if the aperture opening size reaches a reference position. A reference position for aperture position is acquired by the aperture reference position detection section 23, and aperture position is controlled by relative position detection. Relative position detection involves detection using a number of pulses applied to a stepping motor, while reference position detection involves detection using a photo interrupter (PI).

A range ring 51 is arranged around the outside of the interchangeable lens 100. The range ring 51 is capable of being turned around the outside of the interchangeable lens 100, and also slides within a specified range in the optical axis direction of the photographing lens 11. If this range ring 51 is slid towards the subject side it is set to a non-RF (non-range focus) (sometimes also referred to as MF (manual focus)) position, and is set to an RF (range focus) position if it is slid towards the body side. Switching between RF mode and non-RF mode (MF mode) is carried out by sliding the range ring 51. Detection of this mode is carried out by an RF mode detection section 33. Also, the range ring 51 is constructed to be capable of being turned between a close-up end and an infinity end.

Non-RF mode is a mode for carrying out focusing in accordance with rotation direction and rotation amount of the range ring 51 if the user rotates the range ring 51, while RF mode is a mode for focusing to a distance that has been designated by the range ring 51. Specifically, non-RF mode and RF mode are both manual focus, but with non-RF mode designation of a relative distance is carried out by the range ring 51, and differs from RF mode where an absolute distance is designated.

If MF mode is set by sliding the range ring 51, light shielding blades at an inner side of the range ring 51 rotate as one with rotation of the range ring 51. This rotation of the light shielding blades is counted by the photo interrupter (PI), and the focus lens 11b is driven in accordance with this count value. Rotation direction and rotation amount of the range ring 51 may also be detected by a sensor other than a photo interrupter.

If RF mode has been set by sliding the range ring 51, then if the range ring 51 is rotated, that rotation position is detected by the RF position detection section 31. The RF position detection section 31 detects absolute position for rotation position of the range ring 51. The focus lens drive mechanism 25 drives the focus lens 11b to an imaging distance corresponding to the rotation position of the range ring 51, in accordance with control signals from the CPU 41.

The RF mode detection section 33 detects which of the non-RF position (MF position) or the RF position the range ring 51 has been set to, based on output of an RF/MF mode detection switch 83 (refer to FIG. 2).

An MF position detection section 35 detects rotation direction and rotation amount of the range ring 51, when the range ring 51 has been set to the non-RF position (MF position). Manual focus is carried out based on the detection result of this MF position detection section 35.

A zoom ring 52 is arranged around the outside of the interchangeable lens 100, more to the body side than the range ring 51, and is capable of being turned around the outside of the interchangeable lens 100. If the user manually rotates the zoom ring 52, zooming can be carried out.

A zoom position detection section 34 detects an absolute value for rotation position of the zoom ring 52, and outputs to the CPU 41. The zoom position detection section 34 has a linear encoder ZM position detection section 82 (refer to FIG. 2), output of this linear encoder position detection section 82 is subjected to AD conversion by an A/D converter 44 within the CPU 41, and this AD conversion value represents focal length.

A storage section 37 is a rewritable nonvolatile memory, such as flash memory 37 etc., and stores programs for the CPU 41, various information such as optical data of the interchangeable lens, various adjustment values, and various parameters etc. The storage section 37 functions as a storage section for storing first data corresponding to outputs of the second position detection section (for example, refer to the GMR sensor 87) corresponding to a specified position of the lens group, and second data corresponding to target position (for example, refer to Adj_ret_pls which will be described later) at which to stop the lens group.

In accordance with a program stored in the previously described storage section 37, the CPU 41, which is a control section, carries out control within the interchangeable lens 100 in accordance with control instructions from the camera body 200. The CPU 41 is input with detection signals from the aperture reference position detection section 23, the focus lens position detection section 27, the RF position detection section 31, the RF mode detection section 33, the zoom position detection section 34 and the MF position detection section 35, and outputs control signals to the focus lens drive mechanism 25 and the aperture drive mechanism 21.

The CPU 41 also functions as a control section for driving the lens group (for example, the focus lens 11b) in an optical axis direction. Also, at the time of initialization drive, the CPU 41 also associates relative position that has been detected by the GMR sensor 87 after initialization drive with absolute position, using the LDPI 69 for detecting absolute position within the focus lens position detection section 27, and the GMR sensor 87 for detecting relative position (for example, refer to FIG. 12, FIG. 19 and FIG. 20).

An image sensor 201 is arranged inside the camera body 200. This image sensor 201 is arranged close to an image forming position of the photographing lens 11, a subject image formed by the photographing lens 11 is subjected to photoelectric conversion, and image data is output. A control CPU is also provided inside the camera body 200, and carries out communication with the CPU 41 within the interchangeable lens 100.

Next, the detailed electrical structure will be described using FIG. 2. As described previously, the CPU 41 is capable of communication with the camera body 200. The CPU 41 is also connected to a motor driver 71, and this motor driver 71 carries out drive of an LDPI 69, LDMT 73, AVMT 75 and AVPI 77.

The LDPI 69 is a photo interrupter for reference position detection of the focus lens 11b, and output of this LDPI 69 is connected to an LDPI binarization circuit 67. Two LDPI's 69 are provided, and detect three positions as reference absolute positions. Using the three reference absolute positions there is division into four PI intervals, and it is detected which PI interval the focus lens 11b is in. Details will be described later using FIG. 4.

The GMR sensor 87 is a sensor that utilizes the giant magneto resistive effect, and detects position on a scale having SN magnetic poles alternately arranged side-by-side on a GMR scale 85, with high precision. With this embodiment, the GMR scale 85 is fixed to a frame in a lens barrel that moves together with the focus lens 11b, and the GMR sensor 87 is arranged on a fixing member inside the interchangeable lens 100. This GMR sensor 87 detects relative position of the focus lens 11b, and outputs an analog signal corresponding to this position to an A/D converter 72 within the motor driver 71. The relative position detection section is not limited to this, and may also be, for example, a hall element or a normal magneto resistive element. Details will be described later using FIG. 5.

The LDMT 73 is an LD motor (lens drive motor), and functions as the previously described focus actuator within the focus lens drive mechanism 25. In this embodiment a VCM (voice coil motor) is adopted as the LD motor, but it is also possible to use another motor such as a common ultrasonic motor or a DC motor, for example. The AVMT 75 is an aperture motor, and functions as the previously described aperture actuator within the aperture drive mechanism 21.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detection section 23.

An MFPI driver 65 is a driver for the MFPI 63 for detecting turning of the range ring 51 in a case where the range ring 51 has been slid to the MF position. The MFPI 63 is provided at two locations along the turning direction of the light shielding blades. Output of this MFPI 63 is connected to an MFPI binarization circuit 61, and binarized by the MFPI binarization circuit 61. The MFPI binarization circuit 61, MFPI 63, and MFPI driver 65 correspond to the previously described MF position detection section 35.

A linear encoder RF position detection section 81 is a linear encoder for detecting absolute value of the range ring 51 in a rotational direction, in a case where the range ring 51 has been slid to the RF position. The linear encoder RF position detection section 81 is provided along a turning direction of the range ring 51, and outputs an analog signal in accordance with absolute position of the range ring 51 in the turning direction. An A/D converter 43 is provided within the CPU 41, which converts analog signals from the linear encoder RF position detection section 81 to digital signals. AD conversion values from the A/D converter 43 represent subject distance (absolute distance) that has been set by the user.

The linear encoder ZM position detection section 82 is an encoder for detecting absolute value of the zoom ring 52 in the rotation direction. The linear encoder ZM position detection section 82 is provided along the turning direction of the zoom ring 52, and outputs an analog signal in accordance with an absolute position of the zoom ring 52 in the turning direction. The A/D converter 44 is provided within the CPU 41, which converts analog signals from the linear encoder ZM position detection section 82 to digital signals. AD conversion values from the A/D converter 44 represent focal length that has been set by the user.

An RF/MF mode detection switch (SW) 83 is a switch for detecting whether the range ring 51 has been set to the RF mode or set to the MF mode (non-RF mode). This RF/MF mode detection SW 83 detects position of the range ring 51 in the optical axis direction, and is turned on or off when RF mode is set or when MF mode is set, and this on-off state is output to the CPU 41.

Figure 3:
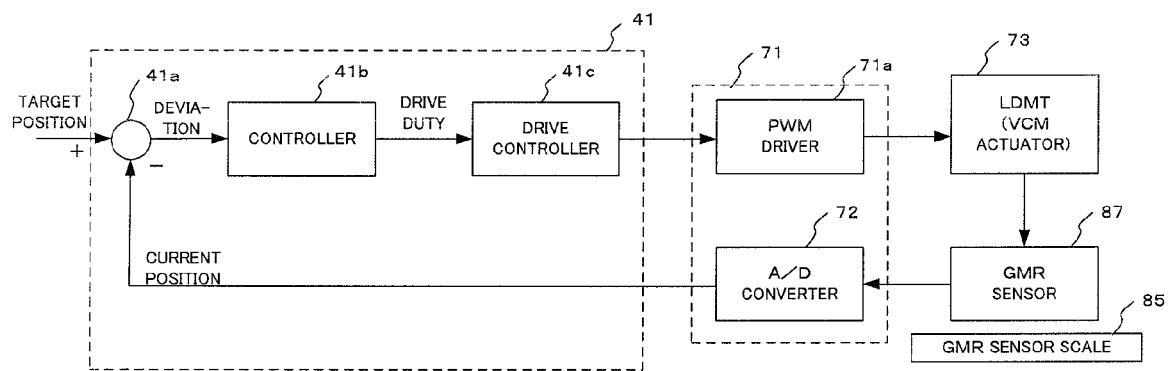
FIG. 3 is a block diagram for describing feedback control of the camera of one embodiment of the present invention.

Next, drive control of the focus lens drive motor LDMT 73 will be described using FIG. 3. With this embodiment, the LDMT 73 is controlled using feedback control, and FIG. 3 is a block diagram illustrating only sections that carry out feedback control. Also, description will be given with an example using a VCM actuator as the LDMT 73. For the sake of convenience it will be denoted the VCM 73.

In FIG. 3, a differential unit 41a, a controller 41b and a driver controller 41c are provided inside the CPU 41. These elements may be constituted by hardware, or by software, or by a mix of hardware and software. Target position input to the differential unit 41a is either stored in the storage section 37 or calculating within the CPU 41, and is a stop target position for the focus lens 11b driven by the VCM 73. A PWM driver 71a and the A/D converter 72 provided inside the motor driver 71. The motor driver 71 is formed integrally with the CPU 41.

Current position of the focus lens 11b that has been detected by the GMR sensor 87, and target position of the focus lens 11b stored in the storage section 37, are subjected to differential calculation in the differential unit 41a. This difference value (differential value) is output to the controller 41b. The controller 41b has a DSP (digital signal processing) section and carries out gain multiplication processing and filter processing on the differential value from the differential unit 41a, and calculates a drive duty to be applied to the VCM 73. With this embodiment, drive control of the VCM 73 is carried out by pulse width modulation (PWM), and a duty ratio for pulse waves is calculated in the controller 41b.

The drive duty calculated in the controller 41b is output to the driver controller 41c. A driver setting value for the PWM driver 71a is converted to in accordance with this input drive duty. This converted driver setting value is output to the PWM driver 71a within the motor driver 71, and the PWM driver 71a applies a drive voltage to the VCM 73.

Acceleration of the VCM 73 is changed in real time by the PWM driver 71a changing the PWM drive duty at a constant frequency, and it is possible to cause the VCM 73 to perform follow-up drive to a correction amount. Also, when a deviation amount from the differential unit 41a is large, higher acceleration occurs, resulting in high output, and control is carried out so as to make the deviation amount 0 in a short time.

Feedback control of the VCM 73 carries out processing periodically using a fixed sampling period. Update to new target position and current position is carried out with periodic processing, calculation is executed by the control section 41b so that a difference between the target position and the current position becomes 0, and driver output is calculated.

Figure 4:
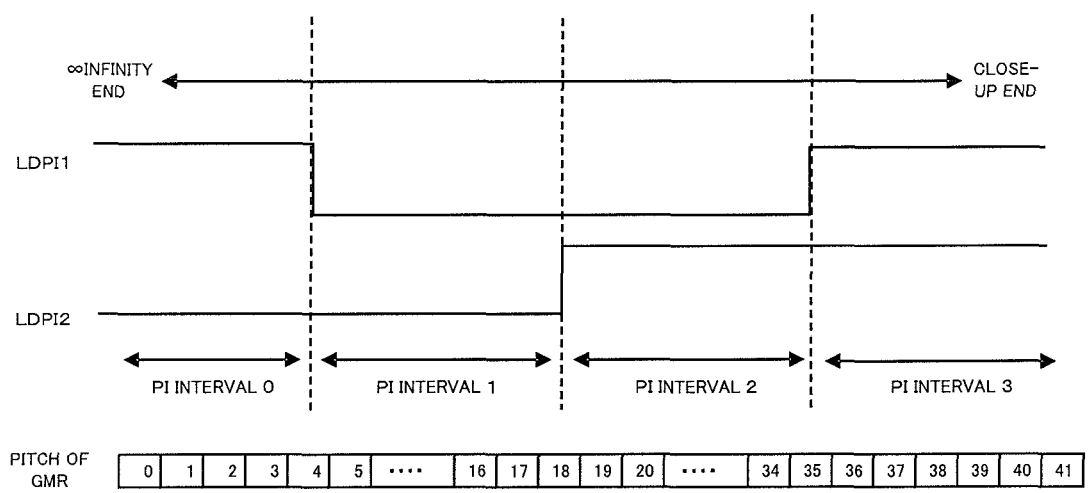
FIG. 4 is a drawing showing a relationship between focus lens PI (LDPI) and pitch of a GMR (giant magneto-resistance), in the camera of one embodiment of the present invention.

Next, a relationship between PI interval detected by the LDPI 69 and pitch detected by the GMR sensor 87 will be described using FIG. 4. The uppermost part FIG. 4 shows position of the focus lens 11b, with a left side of this drawing being the infinity end and the right side being the close-up end. As described previously, two LDPI's 69 are provided, with one being labeled LDPI1 and the other LDPI2. An LDPI 69 outputs L when light has been shielded by aperture blades LDPI (not shown), and outputs H when the blades are open. Since the respective LDPI's 69 provide an H output and an L output in accordance with position of the focus lens 11b, a total of four intervals, PI interval 0 to PI interval 3, are detected, as shown in FIG. 4. Positions where outputs of the LDPI 69 changes define boundaries of the PI intervals.

The lower part of FIG. 4 shows pitch, which is a sensor output of the GMR sensor 87. With this embodiment, pitch of the GMR sensor 87 has 42 outputs, 0-41. Pitch 0-41 of the GMR sensor 87 and PI interval detected by the LDPI 69 have the relationship shown in FIG. 4.

Next, detection of position of the focus lens 11b by the GMR sensor 87 will be described using FIG. 5A-FIG. 5D. As shown in FIG. 5A, the focus lens 11b is held in a lens holding frame 25p, and the lens holding frame 25p is made to slide in the drive direction using a slide shaft 25q. Also, the GMR scale 85 and the lens holding frame 25p are provided integrally with each other, with magnetic poles of S pole and N pole being arranged alternately on the GMR scale 85 at a specified spacing (for example a distance from an S pole to the next S hole being 264 μm).

With this embodiment, a cycle of S→N→S is called one pitch. Also, if 1 μm on the GMR scale 85 is defined as 1 Pls, then if one pitch is 264 μm, one pitch equals 264 Pls.

Also, a magnetic force of 85S is generated from an S pole, and the magnetic force of 85N is generated from an N pole. The GMR sensor 87 and the GMR scale 85 are attached with an adjusted gap amount, and as shown in FIG. 5B the GMR sensor 87 outputs signals GMR-A and GMR-B corresponding to magnetic forces 85S and 85N generated from the GMR scale 85. These signals GMR-A and GMR-B constitute a Sin wave and a Cos wave that have a phase difference of 90° between them.

As was described previously, the GMR scale 85 is attached to the lens holding frame 25p for the focus lens 11b. Therefore, if the focus lens 11b is driven by the VCM 73 to move, the GMR scale 85 also moves, and magnetic force on the GMR sensor 87 varies in accordance with this movement. Outputs of signals GMR-A and GMR-B from the GMR sensor 87 vary in accordance with this variation in magnetic force (refer to FIG. 5B).

By making specified values of the GMR-A signal and the GMR-B signal threshold values and combining H (above threshold) and L (below threshold), it is possible to divide into four intervals, as shown in FIG. 5C. Each of the four intervals into which a single pitch is divided is called a state. For example, if a single pitch is made 264 Pls, a single state becomes 66 Pls.

FIG. 5D shows A phase and B phase of a signal GMR represented on a Lissajous diagram. Specifically, FIG. 5D shows arctangent of an amplitude ratio for A phase and B phase. Regarding a relationship between the A phase and the B phase, a single state is divided into 66 pulses (Pls), and there is a tangent table. The tangent table is a table for converting the angular variation of FIG. 5D, which is arctangent of an amplitude ratio for A phase and B phase, to Pls number. Specifically, the tangent table shows a relationship for Pls values corresponding to respective values for A phase and B phase. The minimum resolution for position detection of the focus lens 11b is 1 Pls. Accordingly, with this embodiment the following relationship is established.

1 pitch=4 states=264 Pls 1 state=66 Pls

264 Pls is an example corresponding to the width of the magnetic scale of the GMR scale 85, and it is also possible to improve resolution by making resolution for 1 Pls less than 1 μm.

Next, an overview of control for initialization drive will be described. Here, initialization drive means drive to an initial position for a lens group at the time of turning on power to the camera, and an initialization operation is also carried out in a restoration operation of a lens group when actual position of the lens group and stored position information do not conform, as a result of disturbance such as strong impact when the camera has been dropped etc. The lens group is driven to a specified position by an initialization drive, and the position where the lens group is stopped is then controlled as a reference position by using Pls number stored as an adjustment value. When carrying out an operation after determination of the reference position, position control is carried out with relative position, based on a result of detection by the GMR sensor 87.

This initialization drive involves making a position that has been measured by the GMR sensor 87, from a position at which output level of the LDPI 69 has changed due to movement of the focus lens 11b (specifically a position where output level has changed from H level→L level, or from L level→H level) to a position at which the focus lens 11b has actually stopped, and the stopped position is taken as a reference position. Pls number for the reference position that has been detected based on this measurement by the GMR sensor 87 is stored in the storage section 37 as an adjustment value, and controlled as a reference position.

Figure 6:
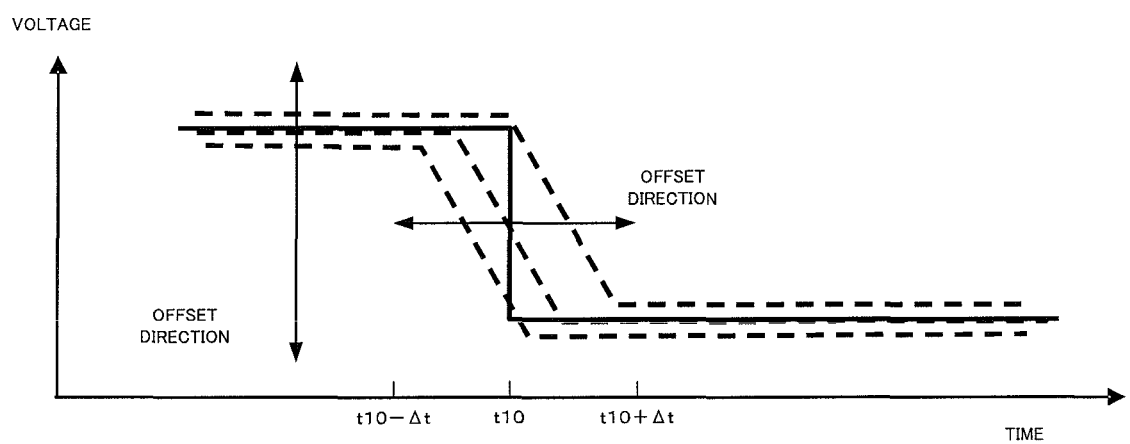
FIG. 6 is a graph showing output variation of LDPI for control of initialization drive, in the camera of one embodiment of the present invention.

However, there may be cases where the position at which variation in output level of the LDPI 69 occurs is out of alignment. For example, in FIG. 6, the horizontal axis shows time variation when the focus lens 11b has been driven for initialization drive, and the vertical axis shows output voltage of the LDPI 69. A solid line in FIG. 6 represents the ideal change, and at time t10 there is a change from H level to L level. However, in actual fact the situation will not be ideal, and as shown by the dotted line (three examples are shown in FIG. 6), there is variability in a range from time t10−Δ to time t10+Δ, and as a result the position at which change in the LDPI 69 output level occurs is offset.

The cause of the positional offset such as is shown in FIG. 6 may be mechanical, such as a relationship between light shielding plates of a photo interrupter (PI) and PI attachment position varying with temperature or over time, or electrical, such as delay in signal processing for PI signal detection, or variation in the amount of light received by the PI. If positional offset occurs in the LDPI 69 in this way, the reference position will be offset, and if drive of the focus lens 11b is carried out based on this offset position, it will not be possible to carry out positional control of the focus lens 11b to an intended position with high precision. With this embodiment, therefore, drive is always performed to the intended position (corrected position) with good precision, by carrying out initialization drive (positioning drive for absolute position) of the VCM 73, as will be described in the following.

Figure 7:
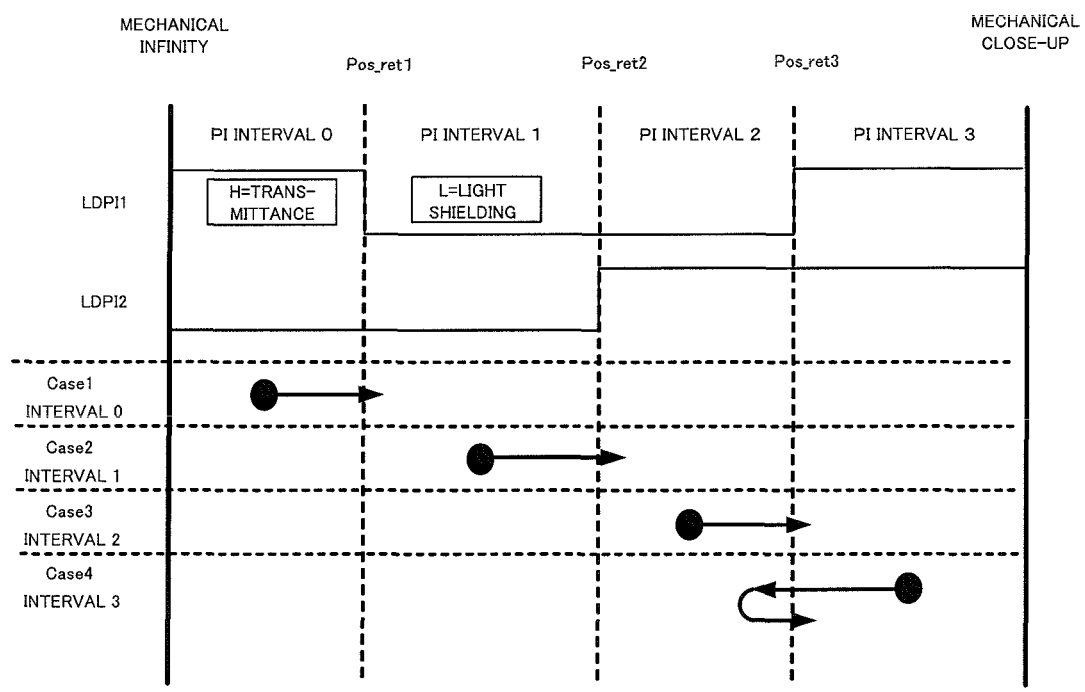
FIG. 7 is a drawing showing an overview of initialization drive, in the camera of one embodiment of the present invention

An overview of initialization drive of this embodiment is shown in FIG. 7. The LDPI 69 has two PIs, namely LDPI1 and LDPI2 arranged within the movement path of the focus lens 11b, and a range from the mechanical infinity end to the mechanical close-up end is divided into four PI intervals in accordance with output level of the LDPI1 and the LDPI2 (refer to FIG. 4).

In FIG. 7 black circles represent position of the focus lens 11b when a power supply is turned on. With this embodiment, when the power supply is turned on a lens reset operation command is transmitted from the camera body 200, and after the interchangeable lens 100 has received the lens reset operation command the focus lens 11b is driven to an initial position. Three initial positions are provided (in the drawing, positions that are separated by specified distances from Pos_ret1-Pos_ret3 towards the close-up end), and as shown in FIG. 7 initial position differs depending on position of the focus lens 11b at the time the power supply is turned on.

Specifically, in the event that the focus lens 11b is in intervals 0-2, the lens is driven towards the close-up end, and if an initial position is reached after passing position Pos_ret1, Pos_ret2 or Pos_ret3 the lens is stopped. Also, in the event that the focusing lens is in interval 3, if position Pos_ret3 is reached after being driven temporarily towards the infinity end, the lens is then driven towards the close-up end and stopped once an initial position is reached. In this way, with this embodiment, the fact that driving is performed towards the nearest position in the close-up direction where output level of the LDPI is switched, means that it is possible to prevent a situation where the time at which it is recognized that the PI signal switches between H level and L level becomes out of alignment depending on drive direction (specifically, whether driving towards the close-up end or driving towards the infinity end). Drive in the opposite direction is also permissible as long as it matches the adjustment direction. Drive in both directions is also possible if adjustment values in both directions are stored. With this embodiment, a lens for focal length adjustment (zoom lens group) is further towards the infinity end than the focus lens 11b, and in the case of interference due to zoom position, at the time of initialization drive, drive is performed to the close-up end in order to prevent interference with the zoom lens group.

Figure 8:
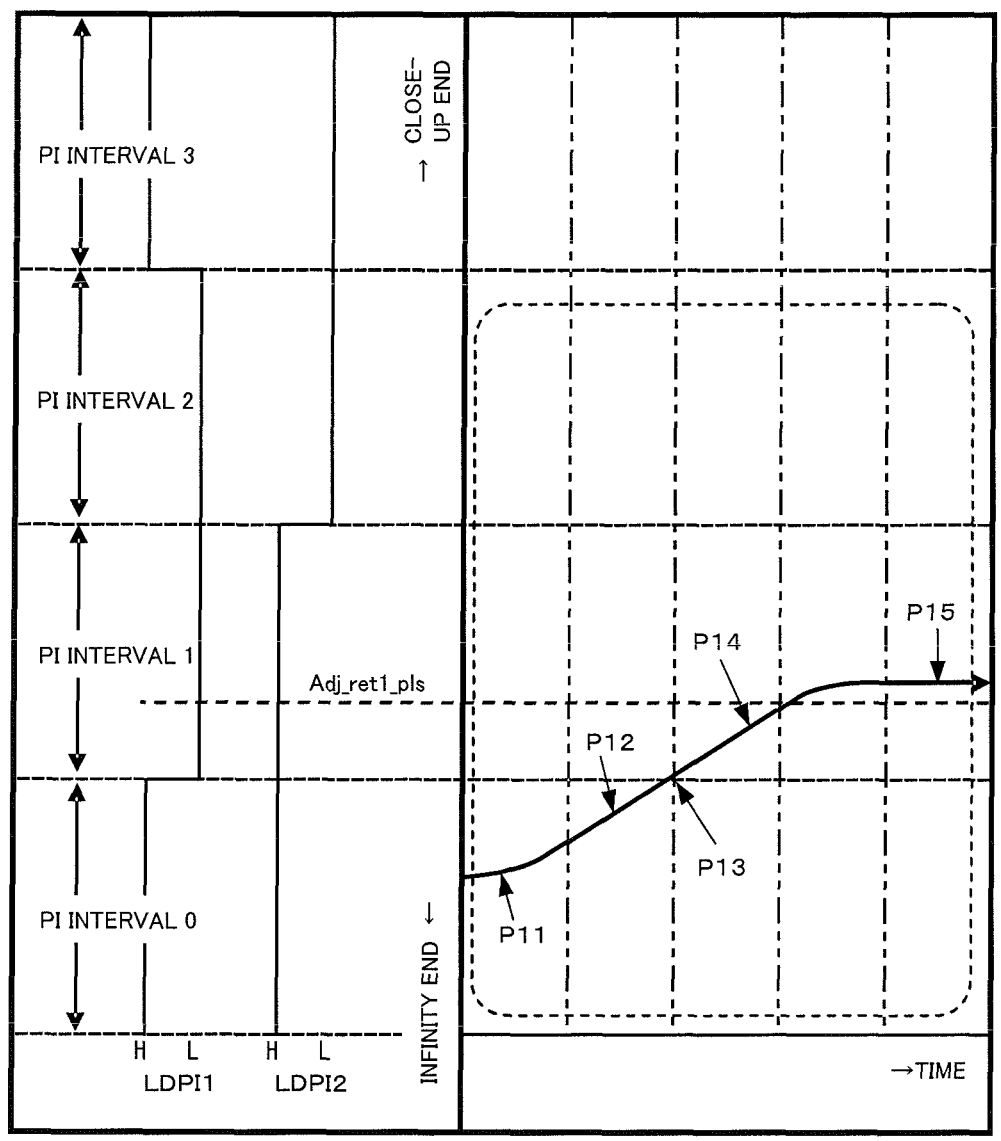
FIG. 8 is a drawing showing operation for initialization drive, in the case where initial position of the focus lens is at PI intervals 0-2, in the camera of one embodiment of the present invention.
Figure 9:
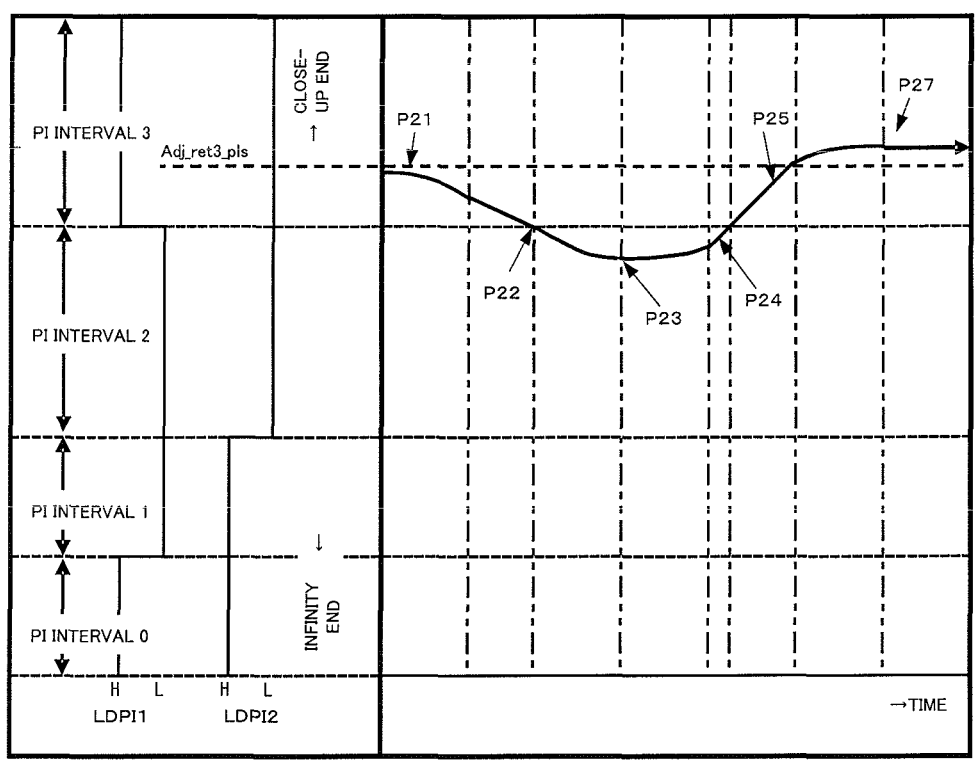
FIG. 9 is a drawing showing operation for initialization drive, in the case where initial position of the focus lens is at PI interval 3, in the camera of one embodiment of the present invention.

Next, an example of operation for initialization drive will be described using FIG. 8 to FIG. 10. At the time of initialization drive, there are the following three operational examples, broadly speaking. (1) focus lens 11b is in intervals 0-2 when the power supply is turned on, (2) focus lens 11b is in interval 3 when the power supply is turned on, (3) focus lens 11b is in intervals 0-3 when the power supply is turned on and the focus lens 11b is close to a position at which detection output of the LDPI 69 switches.

First of all, the above-described operational example (1), namely, the case where the focus lens 11b is in intervals 0-2 when the power supply is turned on, will be described using FIG. 8. With the example shown in FIG. 8, it is a case where the focus lens 11b is in interval 0, but the same operation is carried out for the case where the focus lens is in intervals 1 and 2, shown within the dashed line.

First, in the case where the focus lens is close to position P11, the VCM 73 carries out acceleration until a previously stored speed (Ret_velo [mm/S]) is reached. If position P12 is approached, then since speed Ret_velo [mm/S] is reached drive is carried at a constant speed. Further, at position P13 a switch of LDPI1 is detected (H level→L level). If the position Pos_ret1 is detected (refer to FIG. 4, Pos_ret2 and Pos_ret3 for intervals 2 and 3), deceleration processing is carried out. Here, a deceleration profile is created, and drive is performed with an initialization adjustment position (Adj_ret1_Pls) set as a target position. The deceleration profile is a table describing respective positions up to a target position, and speed at those positions, so as to stop at the target position. The motor driver 71 carries out drive control of the VCM 73 in accordance with the deceleration profile. As a method for speed control, it is possible to control speed based on a relationship of speed=movement amount/time (=movement amount/sample period), by making the movement amount small for every sample period. Also, corresponding to this, it is possible for the deceleration profile to be an arithmetic expression (table) showing change in number of drive pulses for every sample.

Close to position P12 is a region for deceleration drive. Close to position P15, control for settling-time, (drive), specifically, applying a drive voltage and then maintaining a stopped state, and reliably stopping, is awaited. If stop is achieved, Pos_ret1 is detected by current position update, and if the position is offset current position is corrected. Until Pls being controlled in firmware is updated and the next command is received, drive is not performed.

Next, the above-described operational example (2), namely, the case where the focus lens 11b is in interval 3 when the power supply is turned on, will be described using FIG. 9. With operational example (1), initially drive was performed towards the close-up end, but with operational example (2), in the case of being close to position P21 the VCM 73 performs acceleration towards the infinity end until speed (Ret_velo [mm/S]) is reached. At position P22 a switch of LDPI1 is detected (H level→L level). If position Pos_ret3 (refer to FIG. 4) is detected, there is a transition to deceleration processing.

In the case where the focus lens 11b is close to position P23, drive direction is reversed (drive towards the close-upend), and drive is carried out with reacceleration with the initialization adjustment position (Adj_ret3_pls) set as the target position. This reacceleration does not reach speed Ret_velo. Close to position P24 a switch in LDPI1 (H level→L level) is again detected, and deceleration is performed close to position P25. Since deceleration is commenced with the initialization adjustment position (Adj_ret3_pls) set as the target position before speed Ret_velo has not been reached, triangular drive, which will describe later using FIG. 11, is carried out. Close to position P26 control for settling-time is carried out, namely maintaining a stopped state and waiting for reliable stop. If stop is achieved, Pos_ret3 is detected by current position update, and if the position is offset, current position is corrected. pls being controlled within firmware (pls represents absolute position of the focus lens 11b) is updated, and drive is not performed until the next command is received.

Next, the above-described operational example (3), namely, the case where the focus lens 11b is in intervals 0-3 when the power supply is turned on, and the focus lens 11b is close to a position where detection output of the LDPI 69 switches, will be described using FIG. 10. In operational examples (1) and (2), speed Ret_velo [mm/S] which is made the target was reached when change occurred in output of the LDPI. In other words, at the time the focus lens 11b reaches a boundary position (Pos_ret X (X:1-3)), the lens is at a position that is separated from the boundary of a PI interval to an extent that makes it possible to reach speed Reb_veto. However, with this operational example (3), the focus lens 11b approaches towards the boundary position while accelerating, but when the boundary is reached speed Reb_veto is not yet reached. In this way, operational example (3) is a case where the focus lens 11b is at a position close to a boundary of a PI interval.

Figure 11A:
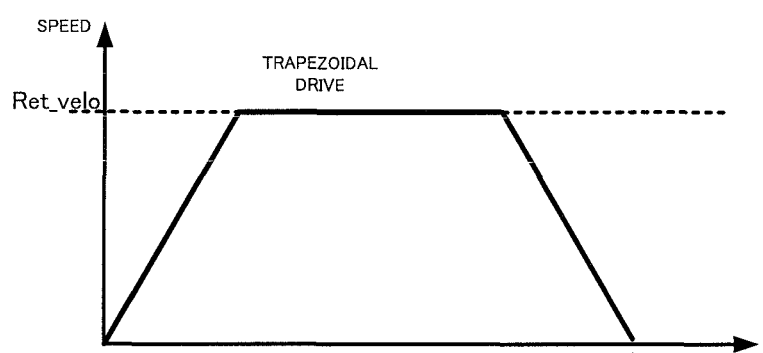
FIG. 11A and FIG. 11B are graphs showing the variation in speed, for a case where trapezoidal drive is carried out as the initialization drive, and a case where triangular drive is carried out, in the camera of one embodiment of the present invention.
Figure 11B:
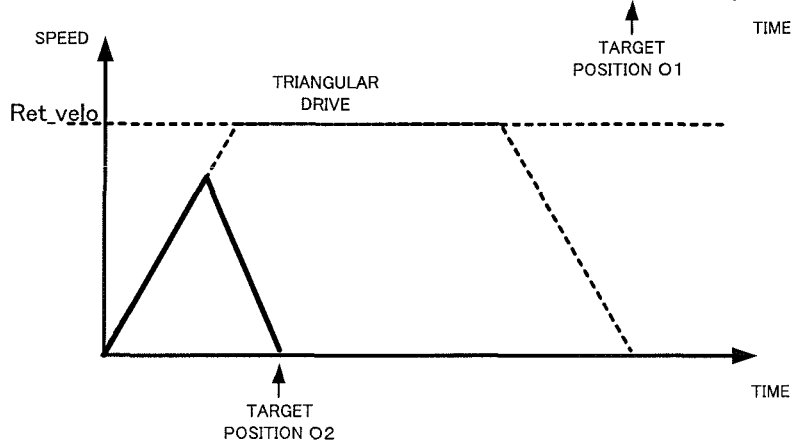

As a result, with operational example (3), at the boundary (Pos_retX (X:1-3)) position of a PI interval, an acceleration and deceleration profile is calculated, and triangular drive is carried out so as to reduce drive time to the initialization drive position (Adj_retX_pls) Pls as a target (refer to FIG. 11B regarding triangular drive). As a result of current position update during drive Pos_ret3 is detected, and so position is offset. Correction is therefore performed using current position update after stopping.

Figure 10:
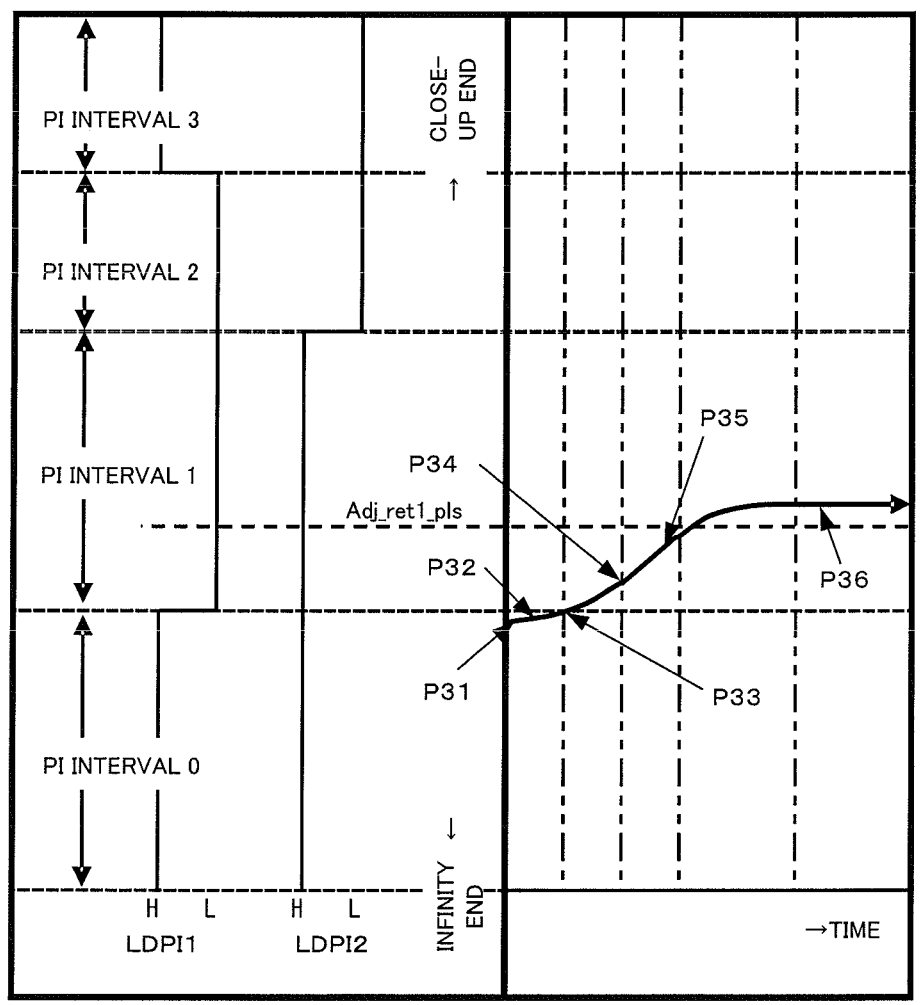
FIG. 10 is a drawing showing operation for initialization drive, in the case where initial position of the focus lens is at PI intervals 0-3, and the focus lens is close to focus lens PI, in the camera of one embodiment of the present invention.

In FIG. 10, drive of the focus lens 11b commences from position P31. At this time, the focus lens 11b is accelerated to achieve speed Ret_velo [mm/S]. In the vicinity of position P32, acceleration is in progress, and in the vicinity of position P33 the output of the LDPI 69 changes. Further, in the vicinity of position P34 the focus lens 11b is driven with triangular drive so as to achieve the minimum drive time. In the vicinity of position P34, an initialization adjustment position (Adj_ret3_pls) is made a target position, deceleration drive is carried out, and the lens is stopped. Close to position P36 control for settling time is carried out, namely maintaining a stopped state and waiting for reliable stop. Correction is performed using current position update after stopping. In this way, in operational example (3), deceleration drive is carried out before speed Ret_velo is reached.

Next, trapezoidal drive and triangular drive will be described using FIG. 11A and FIG. 11B. In the case where the target position is sufficiently far with respect to current position of the focus lens 11b, as in operation examples (1) and (2) described above, after reaching an intended speed Ret_velo, it is possible to reach the target position using deceleration drive. The shape of a trajectory for drive in this case is a trapezoid, as shown in FIG. 11A, and so this drive is called trapezoidal drive.

Conversely, when the target position is close, as in operational example (3), if drive is performed to attain the desired speed Ret_velo, the target position is passed before the intended speed is reached. Drive is therefore carried out to achieve the target position and also make the drive time as short as possible. The shape of a drive trajectory in this case is triangular, as shown in FIG. 11B, and so this drive is called triangular drive.

Next, Pls update using initialization drive and correction value will be described using FIG. 12. At the time of initialization drive, an absolute initial position of the focus lens 11b is unclear (provisional initial position is shown by Ret_temp_Pls). Specifically, even if position of the focus lens 11b is known at the time of turning off a power supply, there is a possibility that the focus lens 11b will move after the power supply is turned off. As a result, although it is possible to detect relative position from the GMR sensor 87, absolute position of the focus lens 11b is unclear.

Therefore, after initialization drive, pls position is updated and fixed using adjustment data. FIG. 12 shows time-series operation at a boundary position Pos_ret1 (refer to FIG. 7) between interval 0 and interval 1, based on output variation of the LDPI 69 (time t0-time t4). Times t0-t4 are reference numerals attributed to time-series, and have no relationship to sampling time.

As described previously, the GMR sensor 87 detects relative position using pitches 0-41, with each pitch having states 1-4. With the example shown in FIG. 12, position Pos_ret1 is in state 1 of pitch 11, and at this position LDPI changes from H level to L level.

At time t0 the power supply is turned on. Current position Pls at this time is made Ret_temp_pls_t0. As was described previously, an accurate absolute position of the focus lens 11b is not known, but it is possible to determine PI interval from the output levels of LDPI1 and LDP2. With the example of FIG. 12 PI interval 0 is determined. A value for provisional Pls (as described previously, Ret_temp_pls_t0) corresponding to an interval for this current position is supplied.

Figure 13:
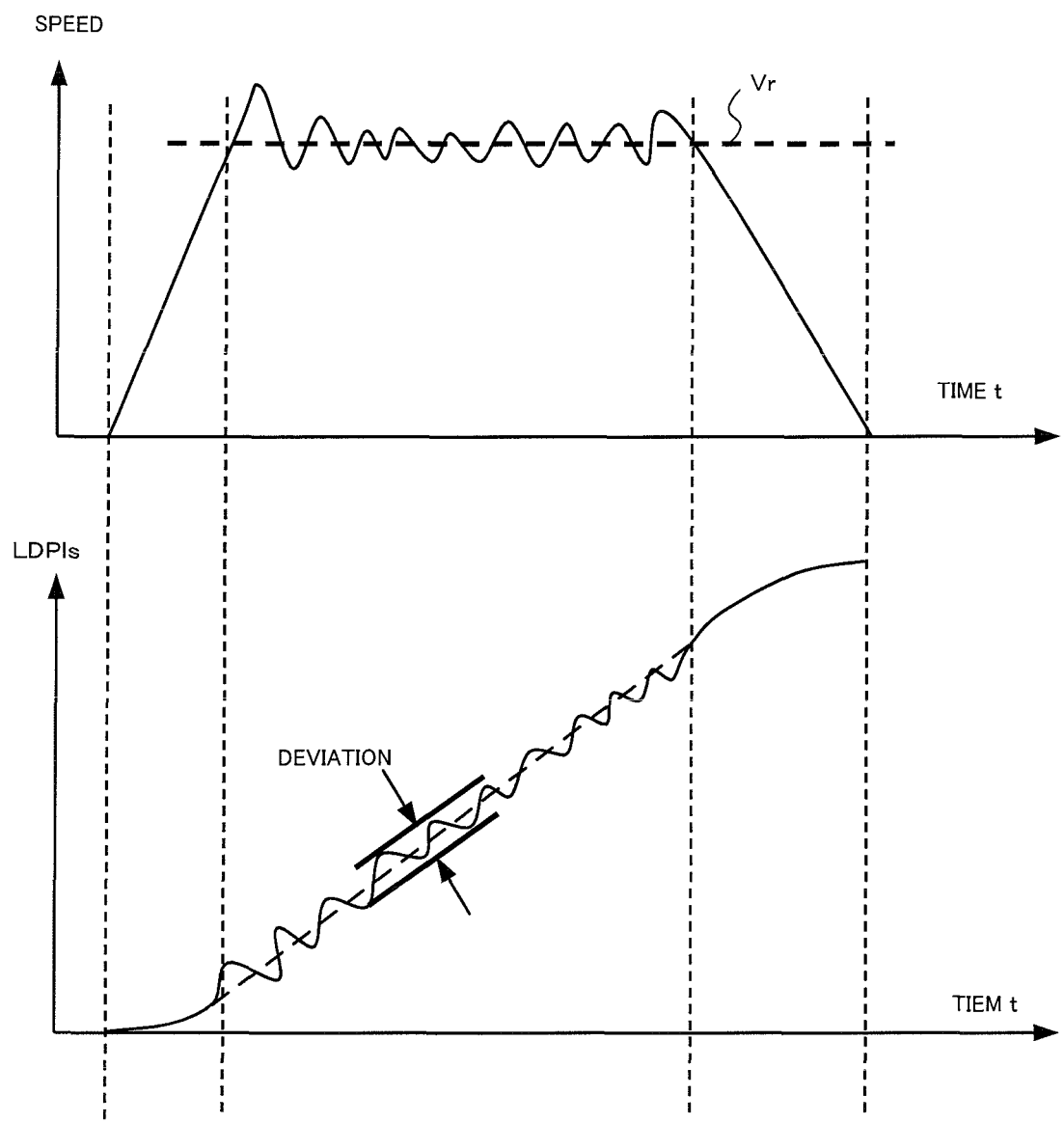
FIG. 13 is a graph showing variation over time of drive speed and focus lens position, in the camera of one embodiment of the present invention

Power supply is turned on at time t0 and drive of the focus lens 11b by the VCM 73 is commenced. Once target speed Ret_velo is reached, drive continues at this target speed. During Drive, output of the GMR sensor 87 is detected every sampling time, and update of current position Pls is carried out. Here, when current position PLs is updated during drive, after sampling there is a delay until the current position Pls is fixed, due to processing time, but while the updating is in progress the focus lens 11b continues to move and so there will be a difference between current position Pls that has been fixed after sampling, and position Pls at the time of sampling. Also, the control section 41 carries out feedback control so as to move the lens to the target position using the VCM 73, but there is misalignment between this target position and the current position Pls due to deviation, as will be described later (FIG. 13). Further, since the LDPIs generate analog signals by carrying out photoelectric conversion of light receipt/light shield, there is misalignment due to electrical signal response. Also, during drive, pitch and state of the GMR sensor 87 are detected and continuously counted.

At time t1, interval 1 is passed into from interval 0, and the output of the LDPI changes. At the time of this change in output of the LDPI, current position Pls is made Ret_temp_pls_now. This current position Pls (Ret_temp_pls_now) has an error as the above described absolute position, and also includes the above-described misalignment. Also, adjustment data for pitch and state, Adj_LD_pitch1 (=11), Adj_LD_state1 (=1) are referenced. With this embodiment, adjustment values for pitch and state at the time of crossing position taking into consideration deviation during drive, and position at which LDPI output changes, are associated by provisional information.

Adj_LD_pitch(X:1-3) represents pitch at the time of crossing an LDPI change position, being a PI interval boundary position (Pos_ret(X)) in initialization adjustment. Adj_LD_state(X:1-3) represents state at the time of crossing an LDPI change position, being a PI interval boundary position (Pos_ret(X)) with initialization adjustment. Then, pitch and state at the time that output of the LDPI changes at the time of initialization drive are set to the adjustment values Adj_LD_pitch1 (=11) and Adj_LD_state1 (=1), and counting of pitch and state commences from this value afterward. Offset between state information at the time the LDPI output changes and adjustment value for state, and a method of correcting this offset, will be described later based on FIG. 14.

If time advances from time t1 to time t2, target stop position and a profile are calculated from current position. Here, a target stop position Trget_pls is calculated from position at which the LDPI output changed Ret_temp_pls_now, using the following equation (1). This target adjustment position is substantially the same as adjustment value (Adj_ret1_Pls) corresponding to target stop position stored in the storage section 37 represented by equation (2), but a difference arises for reasons that will be described later.

Trgt_pls=Ret_temp_pls_now+2state+Ret_off_pls+Ret_off_pitch (1)

Adj_ret1_Pls (2)

(1) above has the following meaning. Specifically, Trgt_pls represents position Pls that is ahead of Ret_temp_pls_now by 2state+Ret_off_pls+Ret_off_pitch from the next state after the state where LDPI changed.

Within equation (2), "2state" is an amount to be added at the time of adjustment so as to be able to correct offset, even if LDPI position is offset. As will be described later using FIG. 14, if positional offsets of the LDPI 69 (state offset) occurs, this state number is corrected by replacing 1state or 3state with an offset amount.

Also, within equation (1) above, Ret_off_pls is Pls number to offset by in order for the state boundary to become a reference. Also, Ret_off_pitch is a Pls number sufficient for deceleration from speed Ret_velo, and a Pls number determined so as to minimize the time lag, and is a fixed value. Ret_off_pls is stored in the storage section 37.

Further, Adj_ret1_Pls is an adjustment value for initialization adjustment. Adj_ret1_Pls is an absolute position Pls value, and absolute value Pls of the focus lens 11b after initialization is determined with this numerical value as a reference. Drive is carried out with Trgt_Pls calculated using equation (1) as a target position, and the position at which the lens actually stops is made Adj_ret1_Pls (equation (2)). Adj_ret2(3)_pls is an adjustment Pls value when performing differential count on a position corresponding to another LDPI change position with Adj_ret1_pls as a reference.

Specific processing by the control section 41 at time t2 involves driving the VCM 73 by a drive amount which is 2state+Ret_off_pls+Ret_off_pitch and a relative Pls value added from the next state after output of the LDPI has changed for Ret_temp_pls_now. Also, since Ret_temp_pls_now includes the above-described offset, Trgt_pls=Adj_ret1_Pls is not strictly true, and an error is generated. However, at time t2 it is not possible to detect that error, and so the error is detected at time t4, and the offset is corrected.

At the time t3, drive is performed in accordance with the profile, and control for settling-time is carried out. Here, since update is performed with 12 KHz sampling on the basis of current position during drive, a stop position is also offset with respect to target position Trgt_pls as a result of this sampling, and the offset from Adj_ret1_Pls becomes larger.

At time t4 there is a stopped state after control for settling-time, and offset from pitch, state and GMR-A/B signals with respect to Adj_ret_pls is added, to update current position (stopped position). Pitch and state are counted during drive, and is possible to detect pitch and state at the start position. Absolute position is known from the tangent table (for to the description for FIG. 5) and pls within a state can be corrected. In this way, a provisional absolute position for the stop position is obtained using pitch and state for the stopped state (current position update 1). By how much the obtained current position differs from an adjustment value, Adj_ret_pls, which is a reference for the absolute position, can then be determined In this way, target stop position is calculated based on Ret_temp_pls_now, which is the provisional initial position, and control is carried out to drive the VCM 73 based on output of the GMR sensor 87 and stop at the target stop position. In parallel with this the following operation is carried out. At the position of Ret_temp_pls_now pitch and state are replaced by an adjustment value, change in pitch and state accompanying drive of the VCM 73 with this adjustment value as an initial value are detected, and pitch and state at the actual stopped position are detected. Actual stopped position is then corrected, making it possible to obtain a provisional absolute position for actual stopped position. Further, if a difference from correction value Adj_ret_pls, which is a reference for absolute position, is obtained, it is possible to obtain a true absolute position.

Next, deviation of speed and position will be described using FIG. 13. The upper parts of FIG. 13 shows drive speed of the focus lens 11b with time indicated on the horizontal axis. In the drawing, a dashed line Vr represents ideal speed in the case of speed deviation 0. If speed deviation is 0 with no variation in speed over time, it is possible to control such that target position=current position.

Also, the lower part of FIG. 13 shares position (LDPls) of the focus lens 11b, with respect to time on the horizontal axis. Current position Ret_temp_pls_now of the focus lens 11b is updated adopting LDPls corresponding to current position during drive, and so includes electrical response times when crossing LDPI change positions of the LDPI 69, and offset (deviation) between target position shown in FIG. 13 and current position.

Next, LDPI position offset at the time of initialization drive will be described using FIG. 14. Even though LDPI position adjustment (pitch, state) is carried out at the time of manufacture etc., which is initialization adjustment, when actually used in initialization drive there may be situations where pitch and state are at a boundary at the time of adjustment, or cases where there is offset between PI position detected at the time of initialization adjustment and at the time of initialization drive, due to variation over time etc. Specifically, with the example shown in FIG. 12, description was given for pitch 11 state 1, at a boundary between PI interval 1 and PI interval 2 (position Pos_ret1). However, at the stage of shipping from the factory, even if this type of adjustment has been carried out there will be cases where the boundary is offset, as shown in case 1-case 3 in FIG. 14, for various reasons, as was described previously. With this embodiment, therefore, adjustment can be carried out even for such an offset.

Figure 14:
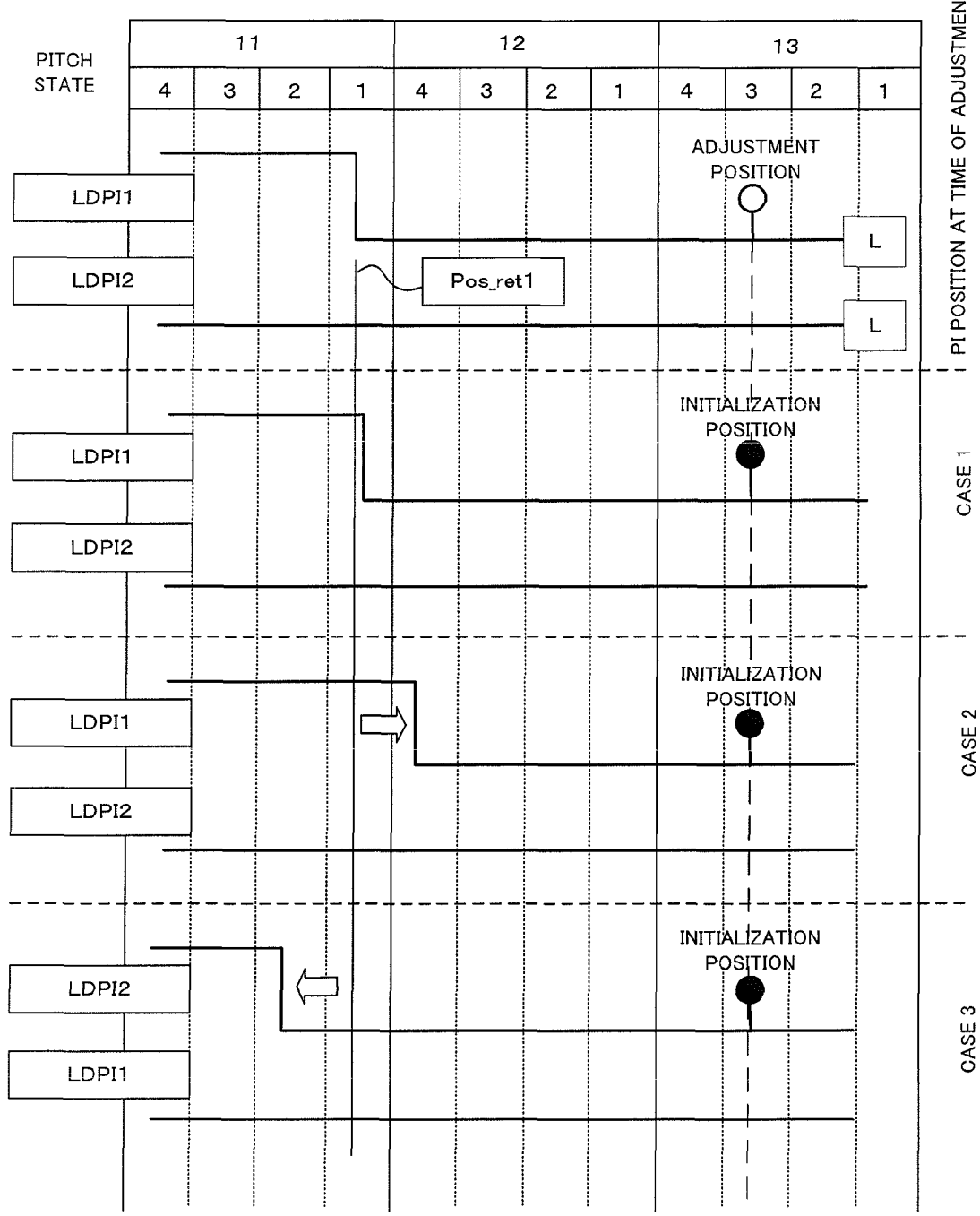
FIG. 14 is a drawing for explaining adjustment of focus lens position offset at the time of initialization drive, in the camera of one embodiment of the present invention.

In FIG. 14, the upper section shows PI position at the time of adjustment, with a boundary between PI interval 1 and PI interval 2 at position Pos_ret1 of pitch 11, state 1. In the next section of FIG. 14 case 1 is shown, and in this case the position where LDPI output changes with initialization drive is not offset. In the next section case 2 is shown, and in this case the position where LDPI output changes with initialization drive is offset towards the close-up end (in the direction of pitch 12). In the section after case 2, case 3 is shown, and in this case the position where LDPI output changes with initialization drive is offset towards the infinity end (in the direction of pitch 10).

At the time of initialization adjustment, Adj_LD_pitch becomes an adjustment value of 11, while Adj_LD_state becomes an adjustment value of 1. In case 1, there is no offset between pitch and state at the time of initialization adjustment and pitch and state at the time of initialization drive, and the pitch and state that have been detected at the time of initialization drive can be adopted as they are. Even for pls level offset within a state, since LDPI output changes, consideration is given to being able to correct by making the next state+2state+Ret_off_pls+Ret_off_pitch Adj_pls.

With case 2, there is offset between pitch and state detected from initialization drive, and pitch and state at the time of initialization adjustment. With this embodiment, a maximum offset amount is considered to be within ±one state. For case two, since the detected state at the time of initialization drive is 4, compared to pitch 11 state 1 at the time of initialization adjustment, when state 4 of the adjacent pitch 12 has been detected it can be determined to be case 2.

With case 3, the detected state is offset. As was described previously, the maximum offset amount is considered to be within ±one state. For case 3, since the detected state at the time of initialization drive is 2, compared to pitch 11 state 1 at the time of initialization adjustment, when pitch 11 state 2 of the adjacent pitch 12 has been detected it can be determined to be case 3.

Figure 12:
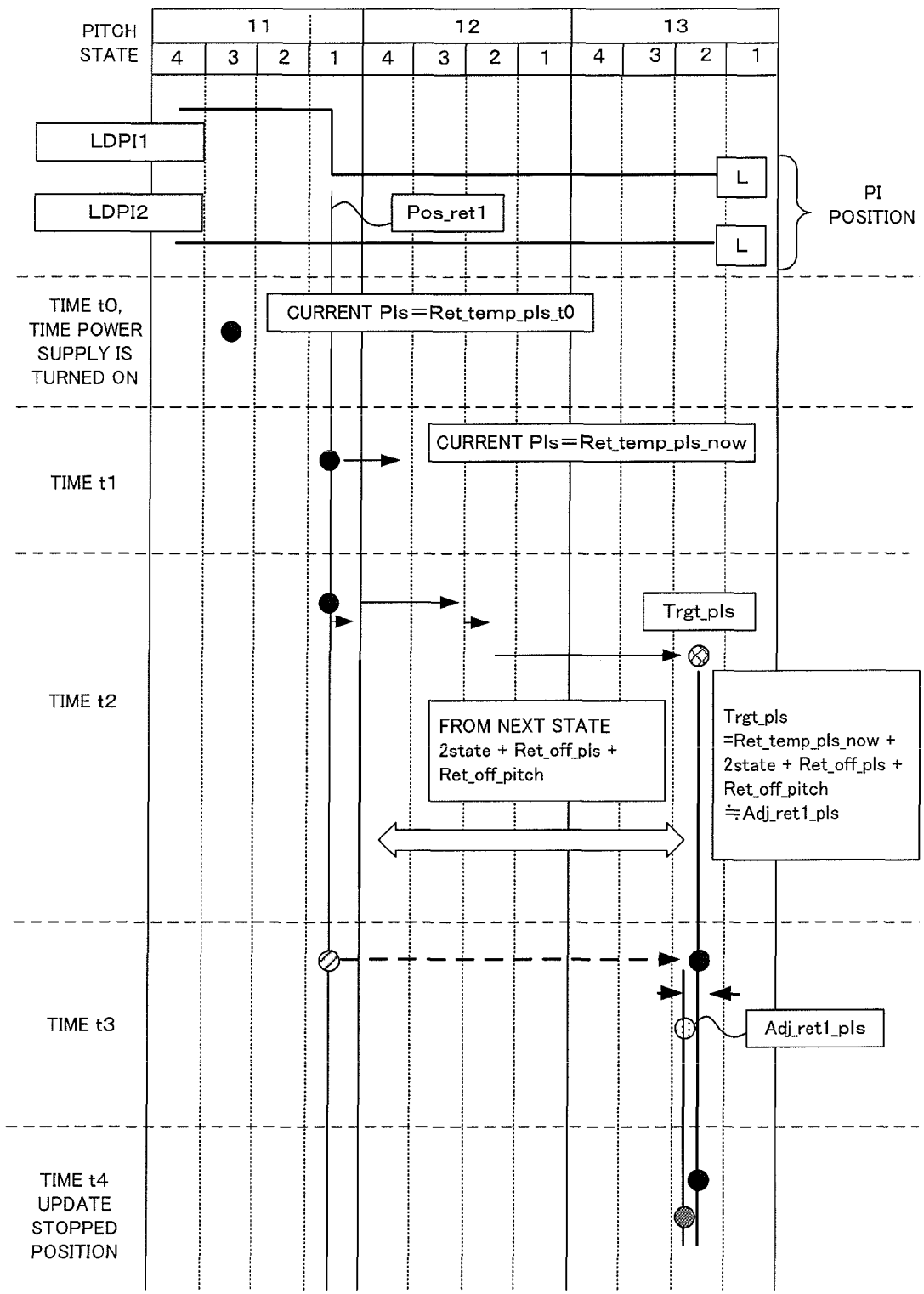
FIG. 12 is a drawing for describing update of initial position using an adjustment value when initialization drive has been carried out, in the camera of one embodiment of the present invention.

In this case, with this embodiment, which of cases 1-3 is determined based on pitch and state detected by the GMR sensor 87 when performing initialization drive and pitch and state acquired at the time of initialization adjustment, and if "2state" within equation (1) that was described in FIG. 12 is made "1state"–"3state" based on the result of this determination, it is possible to correct offset.

Next, operation for initialization drive of this embodiment will be described using the flowcharts shown in FIG. 15 to FIG. 20. These flowcharts are executed by the CPU 41 in accordance with programs stored in the storage section 37, to communicate with a control section within the camera body 200 and control each section.

Figure 15:
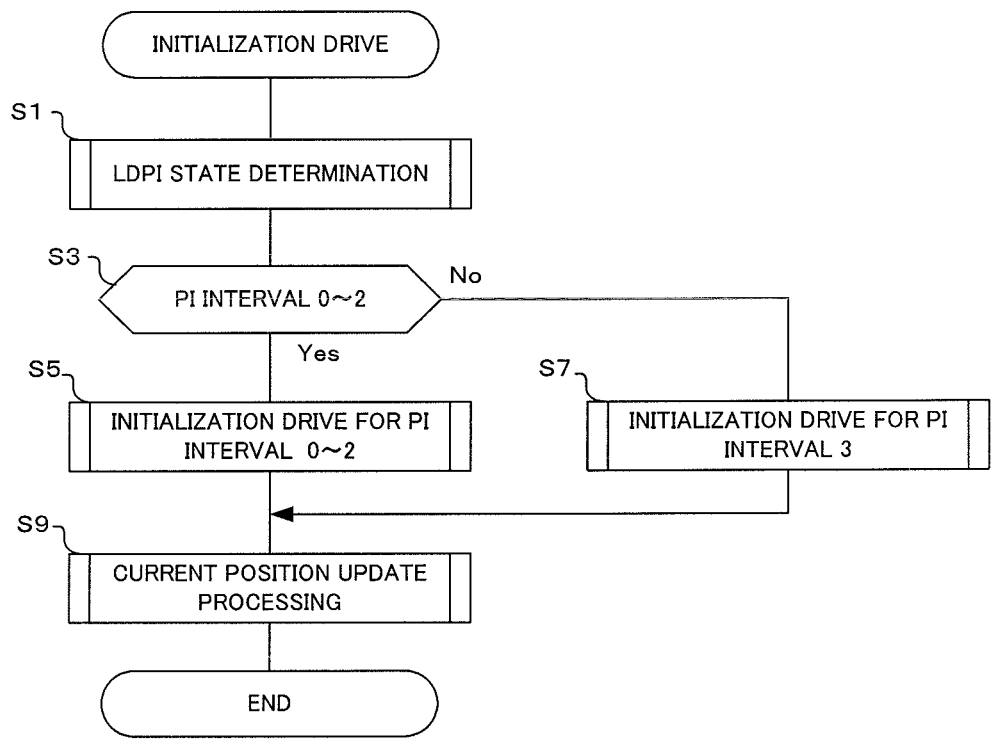
FIG. 15 is a flowchart showing operation of initialization drive, in the camera of one embodiment of the present invention.

If the main flow for initialization drive shown in FIG. 15 is entered, first, LDPI state determination is carried out (S1). Here, it is determined which of PI interval-to PI interval 3 the focus lens 11b is in based on output level of the two PIs of the LDPI 69, namely LDPI1 and LDP2. Detailed operation of this LDPI state determination will be described later using FIG. 16.

If LDPI state determination has been carried out in step S1, it is next determined whether or not the focus lens is in PI intervals 0-2 (S3). Here, determination as to whether or not the focus lens 11b is between PI interval 0 and PI interval 2 is based on results of the LDPI state determination in step S1.

If the result of determination in step S3 is that the focus lens is in PI interval 0-2, initialization drive for PI intervals 0-2 is carried out (S5). Here, as was described using FIG. 8, the focus lens 11b is driven towards the close-up end. Detailed operation of this initialization drive for PI intervals 0-2 will be described later using FIG. 17.

On the other hand, if the result of determination in step S3 is that the focus lens is not in PI intervals 0-2, initialization drive for PI interval 3 is carried out (S7). Since the focus lens 11b is not in PI intervals 0-2, it is in PI interval 3. In this step therefore, as was described using FIG. 9, the focus lens 11b is driven towards the close-up end after being driven temporarily towards the infinity end. Detailed operation of this initialization drive for PI interval 3 will be described later using FIG. 18.

If initialization drive has been carried out in step S5 or S7, next, current position update processing is carried out (S9). Here, current position is updated based on information about pitch and state that had been detected by the GMR sensor 87 for the stopped position, and the GMR-A and GMR-B signals, and also Adj_ret(X)_pls. Detailed operation of this current position update processing will be described later using FIG. 20.

If current position update processing has been carried out in step S9, the flow for initialization drive is terminated.

Figure 16:
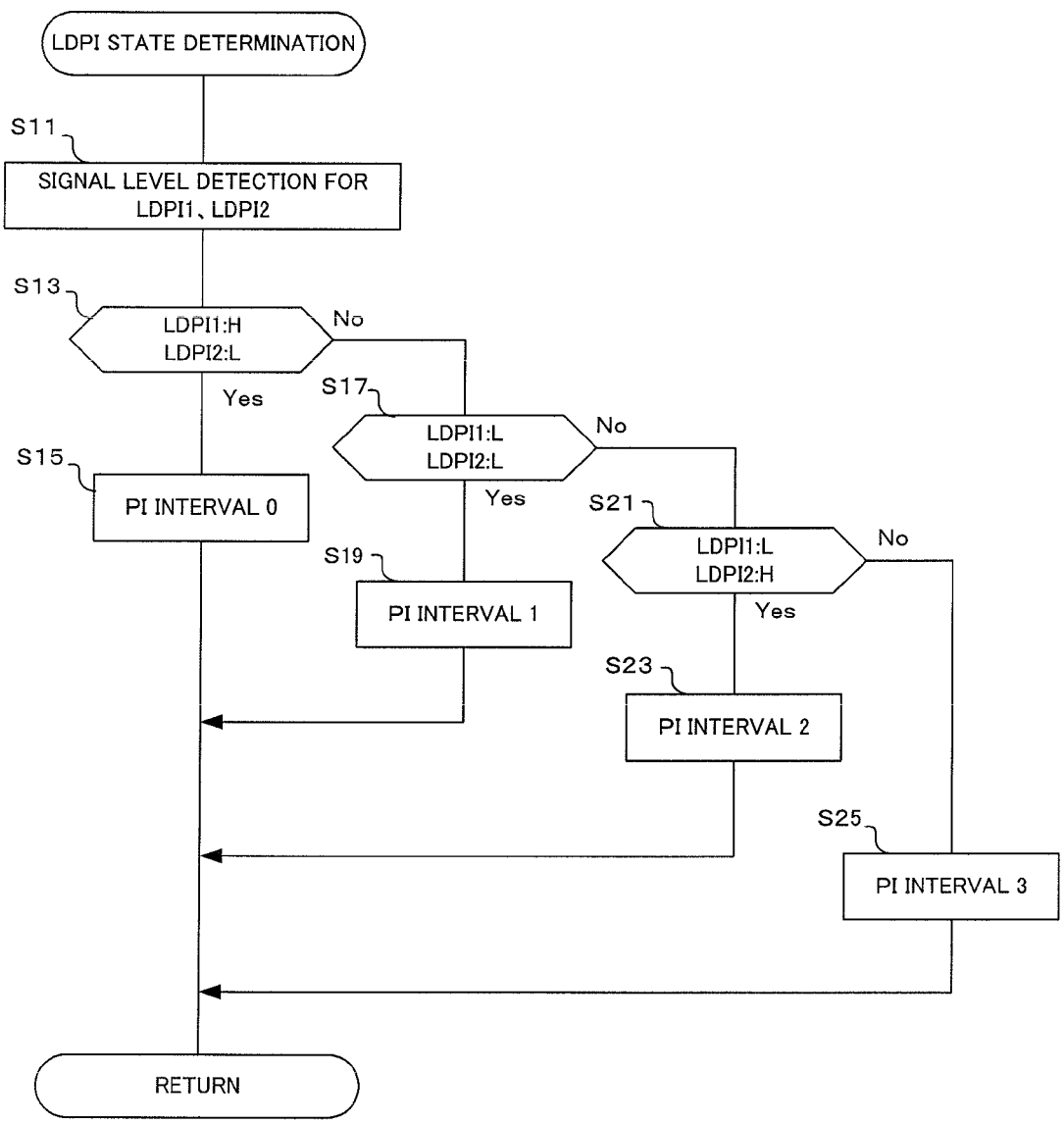
FIG. 16 is a flowchart showing operation of LDPI state determination, in the camera of one embodiment of the present invention.

Next, detailed operation of the LDPI state determination of step S1 will be described using FIG. 16. If this flow is entered, first signal levels of the LDPI1 and LDP2 are detected (S11). Here, the CPU 41 binarizes each output of the two LDPI 69 using the LDPI binarization circuit 67, and this binarized signal has its signal level detected by means of the motor driver 71 (refer to FIG. 2).

If the signal levels of LDPI1, 2 have been detected, it is next determined whether or not LDPI1 is H level and LDPI2 is L level (S13). Here, determination is carried out in accordance with the detection result of step S11. If the result of this determination is Yes, PI interval 0 is set, as shown in FIG. 4 (S15).

If the result of determination in step S13 is No, it is next determined whether or not LDPI1 is L level and LDPI2 is L level (S17). Here, determination is carried out in accordance with the detection result of step S11. If the result of this determination is Yes, PI interval 1 is set, as shown in FIG. 4 (S19).

If the result of determination in step S17 is No, it is next determined whether or not LDPI1 is L level and LDPI2 is H level (S21). Here, determination is carried out in accordance with the detection result of step S11. If the result of this determination is Yes, PI interval 2 is set, as shown in FIG. 4 (S23).

If the result of determination in step S21 is No, then since LDPI1 is H level and LDPI2 is H level, PI interval 3 is set, as shown in FIG. 4 (S25). If determination of PI interval has been performed in steps S15, S19, S23 and S25, the originating processing flow is returned to.

Figure 17:
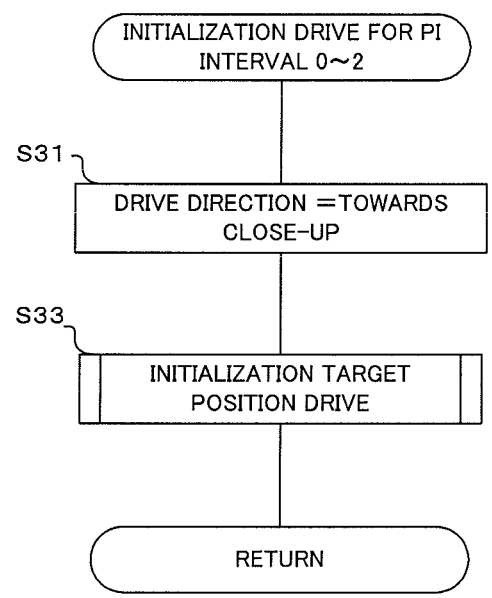
FIG. 17 is a flowchart showing operation of initialization drive for PI intervals 0-2, in the camera of one embodiment of the present invention.

Next, detailed operation of the initialization drive for PI intervals 0-2 in step S5 (refer to FIG. 15) will be described using FIG. 17. If this flow is entered, first the drive direction is set to towards the close-up end (S31). Here, since the focus lens 11b is in PI intervals 0-2, then towards the close-up end is set as the drive direction for the focus lens 11b, as was described using FIG. 8.

If setting of the drive direction has been carried out in step S31, next initialization target position drive is carried out (S33). Here, as was described using FIG. 8, the focus lens 11b is driven towards the target position. In the case that a PI interval border is crossed before reaching speed Ret_velo [mm/S], control is performed using the triangular drive as was described using FIG. 10 and FIG. 11. Detailed operation of this initialization target position drive will be described later using FIG. 19. If initialization target position drive has been carried out, the flow for PI intervals 0-2 is terminated, and the originating flow is returned to.

Figure 18:
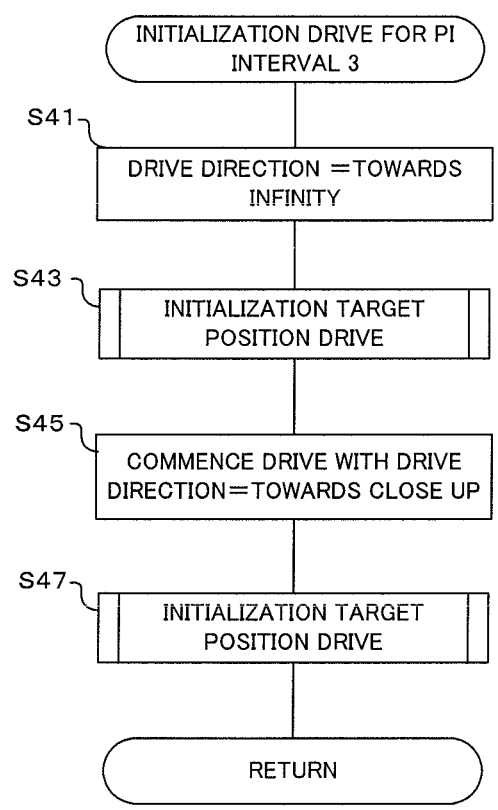
FIG. 18 is a flowchart showing operation of initialization drive for PI interval 3, in the camera of one embodiment of the present invention.

Next, detailed operation of the initialization drive for PI interval 3 in step S7 (refer to FIG. 15) will be described using FIG. 18. If this flow is entered, first the drive direction is set to towards the infinity end (S41). Here, since the focus lens 11b is in PI interval 3, then towards the infinity end is set as the drive direction for the focus lens 11b, as was described using FIG. 9.

If setting up the drive direction has been carried out in step S41, next initialization target position drive is carried out (S43). Here, as was described using FIG. 9, drive of the focus lens 11b towards the infinity end is commenced at speed Ret_velo [mm/S], and if the boundary between PI interval 2 and PI interval 3 is crossed, processing advances to step S45. Detailed operation of this initialization target position drive will be described later using FIG. 19.

If initialization target position drive has been carried out in step S43, next drive is commenced with drive direction set to towards the close-up end (S45). Here, as was described using FIG. 9, drive direction is reversed to towards the close-up end, and the focus lens 11b is driven towards the initialization target position.

If reversing of the drive direction has been carried out in step S45, next initialization target position drive is carried out (S47). Here, as was described using FIG. 9, the focus lens 11b is driven towards the target position. Detailed operation of this initialization target position drive will be described later using FIG. 19. If initialization target position drive has been carried out, the flow for initialization drive for PI interval 3 is terminated, and the originating flow is returned to.

Next, detailed operation of the initialization target position drive of steps S33 (refer to FIG. 17), S43, and S47 (refer to FIG. 18) will be described using FIG. 19. If this flow is entered, first of all acceleration to speed {mm/S] is commenced (S51). Here, as was described using FIG. 8 to FIG. 10, the CPU 41 performance drive control of the VCM 73, to carry out acceleration until the focus lens 11b reaches the speed Ret_velo [mm/S].

If acceleration has commenced in step S51, it is next determined whether or not speed Ret_velo [mm/S] has been reached (S53). Here, the CPU determines whether or not the speed has reached Ret_velo [mm/S] based on change in relative position of the focus lens 11b detected by the GMR sensor 87.

If the result of determination in step S53 is that Ret_velo [mm/S] has not been reached, it is next determined whether or not an LDPI (X) change position has been crossed (S55). Here, the CPU 41 determines whether or not level has changed based on output from the two LDPI 69. Specifically, it is determined whether there has been movement from any of PI intervals 0-3 to an adjacent interval. This determination is carried out every sampling period (for example, 12 kHz).

If the result of determination in S55 is that an LDPI(X) change position has not been crossed, step S53 is returned to. Here, if determination becomes Yes in step S55 before in step S53, then it is a case of the focus lens 11b being close to the LDPI 69 at the time the power supply is turned on, as was described using FIG. 10, and in this case control is carried out using the triangular drive that was described using FIG. 11B so as to give a short drive time (S57-S63). On the other hand, if determination becomes yes in step S53 before in step S55 than it is the case of the Ret_velo [mm/S] being reached when driving the focus lens 11b, as was described using FIG. 8 or FIG. 9, and in this case drive control is carried out using the trapezoidal drive that was described using FIG. 11A (S71-S81).

If the result of determination in step S53 is that speed Ret_velo has been reached, constant speed drive is carried out at Ret_velo [mm/S] (S71). Here, the CPU 41 carries out drive control of the VCM 73 source to maintain a constant speed of the Ret_velo, based on a signal from the GMR sensor 87.

Next, it is determined whether or not an LDPI (X) change position has been crossed (S73). Here, similarly to step S55, the CPU 41 determines whether or not there has been a level change based on output from the two LDPI 69 (refer to P13 in FIGS. 8, and P22 and P24 in FIG. 9). If the result of this determination is that an LDPI(X) change position has not been crossed, crossing is awaited.

If the result of the determination in step S73 is that an LDPI(X) change position has been crossed, next pitch and state at the time that the LDPI (X) change position was crossed are detected (S75). Here, the CPU 41 detects pitch and state when the LDPI(X) change position was crossed based on output from the GMR sensor 87 at the time output level of the LDPI 69 changed. This detection result is stored in the storage section 37.

Next, Adj_LD_pitch(X) and Adj_LD_state(X) are compared, correction is performed if there is offset, and current pitch and state are updated (S77). Adj_LD_pitch (X) and Adj_LD_state (X) are prestored in the storage section 37, these stored values are compared with pitch and state that were detected in step S75, and if they are different they are updated to the pitch and state that were detected in S75. The updated results are stored in the storage section 37.

Next, calculation of target position is carried out (S79). Here, as was described for time t2 in FIG. 12, target position Trgt_pls is obtained from the following equation (1).

$$\text{Trgt\_pls} = \text{Ret\_temp\_pls\_now} + 2\text{state} + \text{Ret\_off\_pls} + \text{Ret\_off\_pitch} \quad (1)$$

The term "2state" in equation (1) is replaced with "1state" or "3state" in the event that PI position offset has occurred, as was described using FIG. 14, and target position is calculated. It is also possible to temporarily stop the focus lens 11b and correct current position.

Once calculation of target position has been carried out, next a deceleration profile is calculated with Trgt_pls as a target position (S81). Here, the CPU 41 makes the Trgt_pls that was obtained in step S79 the target position, and obtains a deceleration profile so as to stop the VCM 73 at this position, by means of calculation. Using this deceleration profile, deceleration drive to the vicinity of P14 in FIG. 8 or P25 in FIG. 9 is carried out (refer to the trapezoidal drive of FIG. 11A).

If the result of the determination in step S55 is that an LDPI(X) change position has been crossed, pitch and state where the LDPI(X) change position was crossed are detected (S57). Here, similarly to step S75, the CPU 41 detects pitch and state when the LDPI(X) change position was crossed based on output from the GMR sensor 87 at the time output level of the LDPI 69 changed. The pitch and state that have been detected here are stored in the storage section 37.

Next, similarly to step S77, Adj_LD_pitch(X) and Adj_LD_state(X) are compared, correction is performed if there is offset, and current pitch and state are updated (S59). The updated results are stored in the storage section 37. Then, similarly to step S79, calculation of target position is carried out (S61). Here, as was described for time t2 in FIG. 12, target position Trgt_pls is obtained from the following equation (1).

$$\text{Trgt\_pls} = \text{Ret\_temp\_pls\_now} + 2\text{state} + \text{Ret\_off\_pls} + \text{Ret\_off\_pitch} \quad (1)$$

The term "2state" in equation (1) is replaced with "1state" or "3state" in the event that PI position offset has occurred, similarly to step S79, and target position is calculated. It is also possible to temporarily stop the focus lens 11b and correct current position.

If calculation of target position has been carried out, next a deceleration profile for Trgt_pls to the target position (triangular drive) is calculated (S63). Here, the CPU 41 makes the Trgt_pls that was obtained in step S61 the target position, and obtains a deceleration profile so as to stop at the target position in the shortest time, by means of calculation. Using this deceleration profile, deceleration drive for close to P33 in FIG. 10 is carried out (refer to the triangular drive in FIG. 11B).

If a profile has been calculated in step S63 or step S81, VCM drive is carried out (S65). Here, the motor driver 71 carries out drive control of the VCM 73 in accordance with the deceleration profile that was obtained by means of calculation (or an acceleration and deceleration profile), and carries out deceleration drive to the vicinity of P14 in FIG. 8, the vicinity of P25 in FIG. 9, or the vicinity of P35 in FIG. 10. If VCM drive has been carried out in step S65, the originating processing flow is returned to.

In this way, in the initialization target position drive, acceleration drive towards a target speed is carried out (S51 etc.), relative distance information (pitch and state) from the GMR sensor 87 is detected when a border between PI intervals (LDPI(X) change position) has been crossed (S57, S75), target position is calculated (S61, S79), and control is carried out so as to stop at this target position (S63, S65, S81). Also, target position is corrected using the detected relative distance information (update state value in accordance with relative distance information S59, S61, S77, S79).

Figure 20:
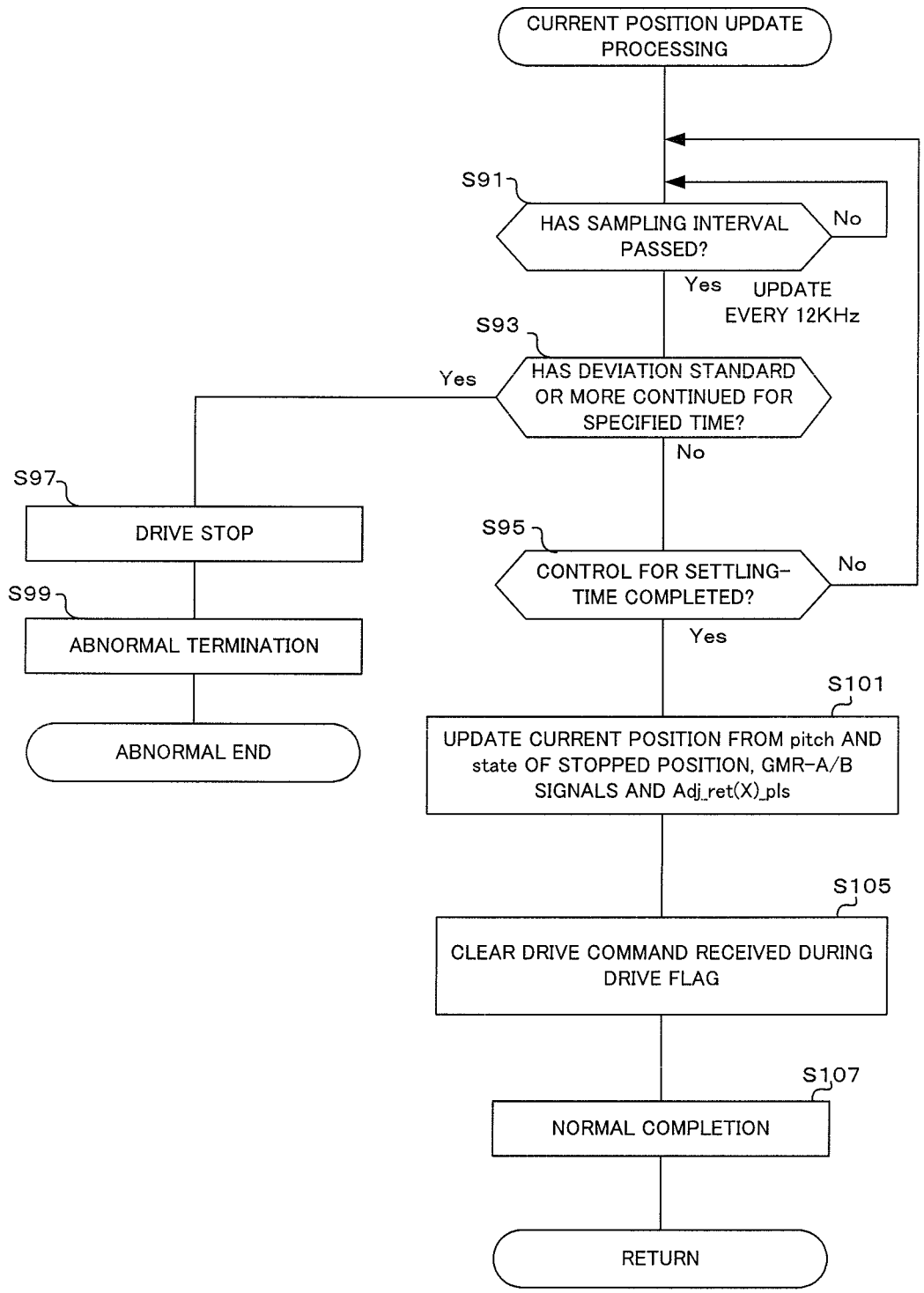
FIG. 20 is a flowchart showing operation of current position update processing, in the camera of one embodiment of the present invention.

Next, detailed operation of the current position update processing in step S9 (refer to FIG. 15) will be described using FIG. 20. If this flow is entered, it is first determined whether or not a sampling interval has elapsed (S91). Current position is detected based on output from the GMR sensor 87, and this detection is carried out at a sampling interval. The sampling interval is made 12 kHz, for example.

If the result of determination in step S91 is that the sampling interval has elapsed, it is next determined whether or not a deviation standard or higher has continued for a specified time (S93). As was described using FIG. 13, in the case of normal operation speed and position fall within a specified range of deviation. In this step it is determined whether or not speed and position are outside the specified deviation range, and whether they have been outside this range for a specified time.

If the result of determination in step S93 is that the deviation standard or higher has continued for a specified time, drive stopped (S97). Since the result of determination in step S93 is that abnormal drive has occurred, drive of the VCM 73 is stopped. If drive has been stopped, abnormal termination is performed (S99). Here, a flag representing that abnormal termination has been performed is set, and the initialization drive is terminated.

On the other hand, if the result of determination in step S93 is that the deviation standard or higher has not continued for a specified time, it is next determined whether or not control for settling-time is completed (S95). Since deceleration drive towards the target position was commenced in previously described step S65, in this step it is determined whether or not there has been a reliable stop after reaching the target position and then holding a stopped state. If the result of this determination is that control for settling-time has not been completed, processing returns to step S91.

If the result of determination in step S95 is that control for settling-time has been completed, next the current position (stopped position) is updated based on pitch and state of the stopped position, the GMR-A and the GMR-B, and an adjustment value Adj_ret(X)_pls (S101). Here, pitch and state of the stopped position are updated based on signals from the GMR sensor 87, and state is updated based on the tangent table. In this way, the stopped position is corrected based on output signals from the GMR sensor 87 in the stopped state, using the correction value Adj_ret(X)_pls, and current position (stopped position) is updated. The updated results are stored in the storage section 37.

In this way, current position update is carried out in step S101, and an absolute position of the current position (stopped position) is determined. Since the target position Trgt_pls is near to Adj_ret(X)_pls (refer to equation (2)), it is not very far away from the current position that was acquired in S101. Therefore, an offset between the current position (stopped position) and the stop target position Trgt_pls is added to Adj_ret(X)_pls based on the GMR sensor output that was acquired in S101, and current position (stopped position) is updated. Specifically, the updated current position is updated using "pitch and state of stopped position"−"stop target position Trgt_pls", in other words, using a difference between stopped position and stop target position based on GMR sensor output at the time of stop. The updated results are stored in the storage section 37. Although correction of the current position (current position) is carried out, drive is not carried out.

If current position update has been carried out in step S101, next a drive command received during drive flag is cleared (S105). Initialization drive commences operation if a drive command is received from the camera body 200, and at that time a drive command received flag is set (not shown in this processing flow). In this step, since initialization drive is completed, the drive command received flag is reset.

If the drive command receipt flag has been cleared, next normal termination is performed (S107). Here, a flag representing that initialization drive has completed normally is set. Once normal termination has been performed the originating flow is returned to.

In this way, in the flow for current position update processing, if the VCM 73 stops the focus lens 11b at the target position, Adj_ret(X)_pls is corrected using information that has been acquired from the GMR sensor 87, and an absolute position for stopped position is determined.

As has been described above, one embodiment of the present invention comprises a lens group capable of movement in an optical axis direction (for example the focus lens 11b), a control section for driving this lens group in the optical axis direction (for example, CPU 41), a first position detection section for detecting an absolute position of the lens group in the optical axis direction (for example, LDPI 69), a second position detection section for detecting a relative position of the lens group in the optical axis direction (for example, GMR sensor 87), and a storage section (for example, storage section 37) for storing first data (for example pitch and state output from the GMR sensor 87) corresponding to output of the second position detection section corresponding to a specified position of the lens group (for example, position Pos_ret1 in FIG. 12) and the second data (for example, Adj_ret_pls) corresponding to target position at which the lens group is to be stopped. The control section (for example, CPU 41) drives the lens, acquires output of the second position detection section at a point in time where a specified change has occurred in output of the first position detection section corresponding to a specified position (for example, time t1 in FIG. 12, S55 and S73 FIG. 19 in) as third data (for example, GMR sensor output, pitch and state) (for example, Ret_temp_pls_now at the time t1 in FIG. 12, S57 and S75 in FIG. 19), calculates stop target position based on the first data and the third data (for example equation (1) described above, S61 and S79 in FIG. 19), and executes a stop operation for the lens group to stop the lens group (for example, time t3 in FIG. 12, S63, S65 and S81 in FIG. 19, and S91-S95 in FIG. 20), and corrects output of the second position detection section in a state where the lens group has been stopped, based on the second data that has been stored in the storage section and the target stop position (for example time t4 in FIG. 12 and S95 and S101 in FIG. 20). With this embodiment, therefore, high precision positional control of a lens group becomes possible.

Patent publication 1 described above can detect position of a lens group using a plurality of photo sensors. However, position detection suffers from misalignment caused by mechanical factors, such as misalignment caused by a relationship between light shielding plates of a photo interrupter (hereafter called "PI") used as a photosensor and attachment position of the PI, as well as variation with temperature or time, and misalignment caused by electrical factors, such as offset caused by delay in signal processing for PI signal detection and variation in light receiving sensitivity of the PI. As a result, positional control of the lens group is degraded. Conversely, with the present embodiment, since output of the second position detection section in a state where the lens group is stopped is corrected, it is possible to carry out positional control of the lens group with high precision.

Also, with one embodiment of the present invention the control section (for example, CPU 41), when correcting output of the second position detection section in a state where the lens group has been stopped (for example, S101 in FIG. 20), corrects output of the second position detection section by adding a difference between output of the second position detection section and the stop target position to first data. Specifically, in an example shown in one embodiment of the present invention, a corrected position is second data+control offset, in other words "pitch and state of the stopped position"–"stop target position Trgt_pls", or put yet another way, update is performed using a difference between stopped position and stop target position, based on output of the GMR sensor at the time of stop.

Also, with one embodiment of the present invention, the control section (for example, CPU 41) when calculating stop target position of the lens group, corrects the stop target position based on a difference between first data and third data. Specifically, in an example shown in one embodiment of the present invention, as was described for cases 2 and 3 in FIG. 14, in an equation (1) for calculating stop target position Trgt_pls, stop target position is corrected by making 2state either 1state or 3state.

Also, with one embodiment of the present invention, the control section (for example, CPU 41) does not carry out correction of the stop target position in the event that there is no difference between the first data and the third data. Specifically, in one embodiment of the present invention, as shown in the case of FIG. 14, and steps S59 and S77 in FIG. 19, for example, correction is not carried out in the event that there is no difference between first data, and pitch and state of the third data.

Also, with one embodiment of the present invention, the second position detection section (for example, GMR sensor 87) outputs a first signal and a second signal (for example, signals GMR-A and GMR-B shown in FIG. 5B) that vary with phase shifted from each other in accordance with variation in position of the lens group, and generates position information based on a ratio of amplitude of the first signal and amplitude of the second signal (for example, refer to FIG. 5D).

Also, with one embodiment of the present invention, the above described first data includes first state information relating to amplitude of the first signal and the second signal in accordance with position of the lens group (for example, signals GMR-A and GMR-B shown in FIG. 5B). The control section (for example, CPU 41) then acquires third state information relating to respective amplitudes of the first signal and a second signal in accordance with position of the lens group, when acquiring third data (for example, time t1 in FIG. 12, and S57 and S75 in FIG. 19).

Also, with one embodiment of the present invention, the above described first state information and third state information represent combinations of high-level and low-level of a signal derived by binarizing amplitude of the first signal and a signal derived by binarizing amplitude of the second signal (for example, refer to FIG. 5C).

Figure 19:
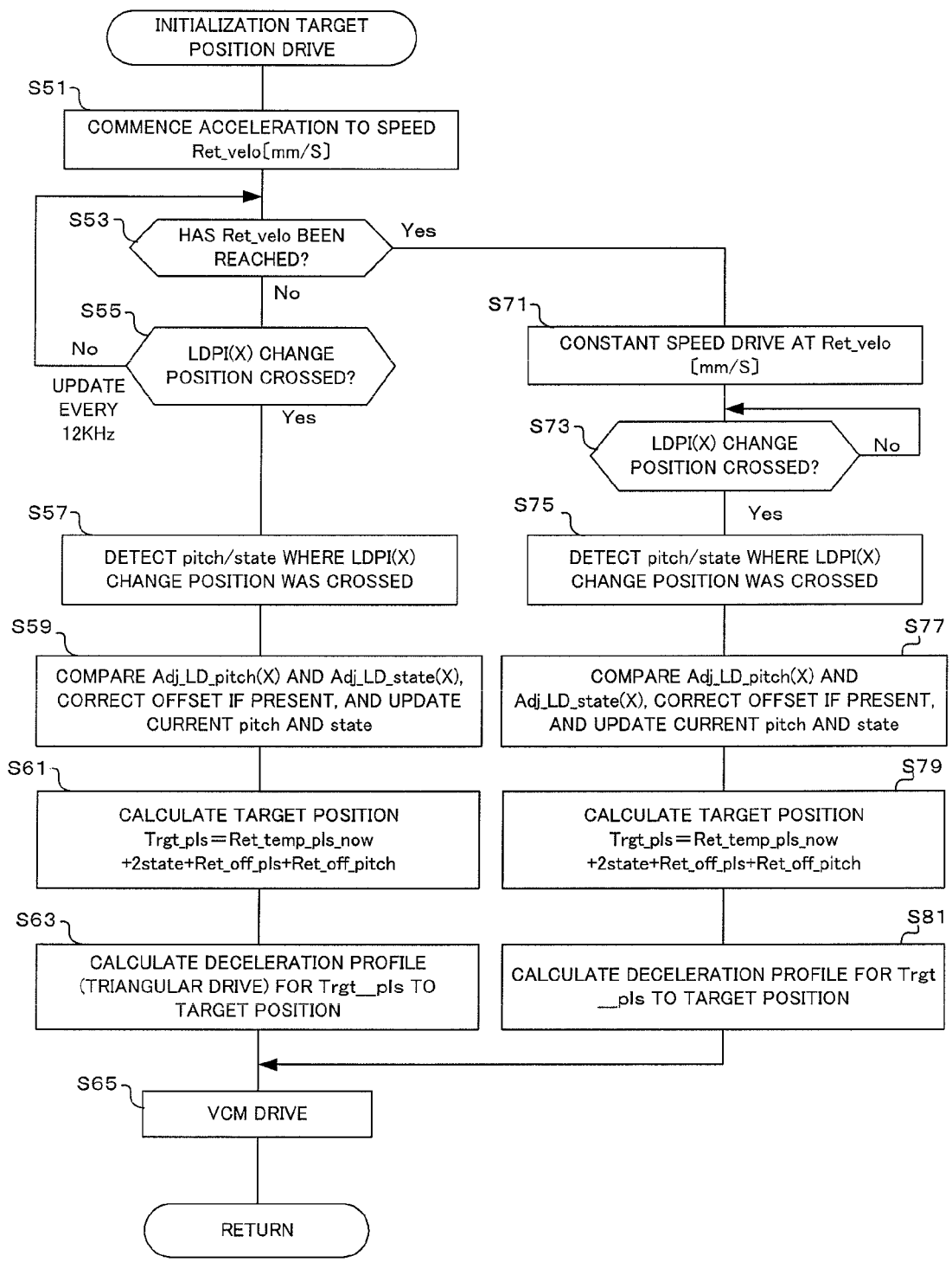
FIG. 19 is a flowchart showing operation of initial target position drive, in the camera of one embodiment of the present invention.

Also, with one embodiment of the present invention, the control section moves the lens group at a specified constant speed when a specified change has occurred in the output of the first position detection section (for example, S71 in FIG. 19). As a result, when the lens group is moved at a specified constant speed, it is possible to detect output variation of the first position detection section, and is possible to carry out stable detection.

Also, with one embodiment of the present invention when carrying out a stop operation for the lens group, the control section commences the stop operation after output of the second position detection section has changed by specified amount, from a point in time where specified change has occurred in the output of the first position detection section (for example, S55-S65, S73-S81, and S65 in FIG. 19). As a result, it is possible to carry out stop at a specified deceleration, and it is possible to always make the stop position at the same position.

With one embodiment of the present invention, by adjusting the number of LDPIs it is possible to change the number of PI intervals. Also, numerical values given in the description of the one embodiment are merely examples, and can be appropriately changed. Also, description has been given with an example of a focus lens as a lens group, but it is also possible to use a zoom lens group or a lens group having another function.

Further, with this embodiment, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), game console etc. In any event, it is possible to adopt the present invention as long as a device is capable of shooting where an initialization operation of a lens group is carried out.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument having a lens group capable of moving in an optical axis direction, comprising:
   a control section for driving the lens group in the optical axis direction,
   a first position detection section for detecting an absolute position of the lens group in the optical axis direction,
   a second position detection section for detecting a relative position of the lens group in the optical axis direction, and
   a storage section for storing first data corresponding to output of the second position detection section corresponding to a specified position of the lens group, and second data corresponding to a target position to which the lens group is to be moved,
   wherein
   the control section drives the lens group and acquires output of the second position detection section, at a point in time when a specified variation has occurred in the output of the first position detection section corresponding to the specified position, as third data, calculates a stop target position based on the first data and the third data and executes a stop operation for the lens group to stop the lens group, and corrects outputs of the second position detection section in a state where the lens group has been stopped, based on the second data that has been stored in the storage section, and the stop target position.

2. The optical instrument of claim 1 wherein:
   the control section, when correcting output of the second position detection section in a state where the lens group has been stopped, corrects output of the second position detection section by adding a difference between output of the second position detection section and the stop target position to the first data.

3. The optical instrument of claim 1 wherein:
   the control section, when calculating stop target position for the lens group, corrects stop target position based on the first data and the third data.

4. The optical instrument of claim 3 wherein:
   the control section does not carry out correction of the stop target position in the event that there is no difference between the first data and the third data.

5. The optical instrument of claim 1 wherein:
   the second position detection section outputs a first signal and a second signal that change with alternate phases offset, for a change in position of the lens group, and
   generates position information based on the ratio of amplitude of the first signal to amplitude of the second signal.

6. The optical instrument of claim 5, wherein:
   the first data includes first state information relating to amplitude of the first signal and the second signal in accordance with position of the lens group, and
   the control section, when acquiring the third data, acquires third state information relating to respective amplitudes of the first signal and the second signal in accordance with position of the lens group.

7. The optical instrument of claim 6 wherein:
   the first state information and third state information represent combinations of high-level and low-level of a signal derived by binarizing amplitude of the first signal and a signal derived by binarizing amplitude of the second signal.

8. The optical instrument of claim 1 wherein:
   the control section, when a specified change has occurred in output of the first position detection section, drives the lens group at a specified constant speed.

9. An optical instrument having a lens group capable of moving in an optical axis direction, comprising:
   a control section for controlling position of the lens group by driving in the optical axis direction,
   a first position detection section for detecting an absolute position of the lens group in the optical axis direction,
   a second position detection section for detecting a relative position of the lens group in the optical axis direction, and
   a storage section for storing first data corresponding to output of the second position detection section corresponding to a specified position of the lens group, and second data corresponding to a target position to which the lens group is to be moved,
   wherein
   the control section drives the lens group and acquires output of the second position detection section, at a point in time when a specified variation has occurred in the output of the first position detection section corresponding to the specified position, as third data, calculates a stop target position based on the third data and executes a stop operation for the lens group to stop the lens group, and corrects output of the second position detection section in a state where the lens group has been stopped, based on a difference between the first data and the third data, the second data, and the stop target position.

10. The optical instrument of claim 9, wherein:
    the control section, when correcting output of the second position detection section in a state where the lens group has been stopped, corrects output of the second position detection section by adding a difference between output of the second position detection section and the stop target position to the first data.

11. The optical instrument of claim 9, wherein:
the second position detection section outputs a first signal and a second signal that change with alternate phases offset, for a change in position of the lens group, and generates position information based on the ratio of amplitude of the first signal to amplitude of the second signal.

12. The optical instrument of claim 11, wherein:
the first data includes first state information relating to amplitude of the first signal and the second signal in accordance with position of the lens group, and
the control section, when acquiring the third data, acquires third state information relating to respective amplitudes of the first signal and the second signal in accordance with position of the lens group.

13. The optical instrument of claim 12, wherein:
the first state information and third state information represent combinations of high-level and low-level of a signal derived by binarizing amplitude of the first signal and a signal derived by binarizing amplitude of the second signal.

14. The optical instrument of claim 9, wherein:
the control section, when a specified change has occurred in output of the first position detection section, drives the lens group at a specified constant speed.

15. A control method, for controlling initial position of a lens group of an optical instrument having a lens group capable of moving in an optical axis direction, and comprising a first position detection section for detecting absolute position of the lens group in the optical axis direction, and a second position detection section for detecting relative position of the lens group in the optical axis direction, comprises:
driving the lens group and acquiring output of the second position detection section, at a point in time where a specified variation in output of the first position detection section has occurred, as third data,
calculating a stop target position based on first data previously set as output of the second position detection section corresponding to a position of the lens group corresponding to specify change in output of the first position detection section, and the third data, and executing a stop operation for the lens group to stop the lens group, and
correcting output of the second position detection section in a state where the lens group has been stopped, based on previously set second data as data corresponding to target position at which the lens group is to be stopped, and the stop target position, to give an initial position.

16. The control method of claim 15, further comprising:
when correcting output of the second position detection section in a state where the lens group has been stopped, correcting output of the second position detection section by adding a difference between output of the second position detection section and the stop target position to the first data.

17. The control method of claim 15, further comprising:
when calculating stop target position for the lens group, correcting the stop target position based on a difference between the first data and the third data.

18. The control method of claim 17, further comprising:
not carrying out correction of the stop target position when there is no difference between the first data and the third data.

19. The control method of claim 15, further comprising:
when a specified change has occurred in output of the first position detection section, driving the lens group at a specified constant speed.

* * * * *